(12) United States Patent
Felisa

(10) Patent No.: US 12,096,533 B1
(45) Date of Patent: Sep. 17, 2024

(54) MONITORING AND RESPONDING TO POOR VISIBILITY CONDITIONS BY ANALYZING IMAGES USING DEEP NEURAL NETWORK

(71) Applicant: Ambarella International LP, Santa Clara, CA (US)

(72) Inventor: Mirko Felisa, Parma (IT)

(73) Assignee: Ambarella International LP, Santa Clara, CA (US)

( * ) Notice: Subject to any disclaimer, the term of this patent is extended or adjusted under 35 U.S.C. 154(b) by 709 days.

(21) Appl. No.: 17/319,366

(22) Filed: May 13, 2021

(51) Int. Cl.
*G06T 7/55* (2017.01)
*B60Q 1/04* (2006.01)
*B60Q 1/20* (2006.01)
*B60Q 1/46* (2006.01)
*G06V 20/56* (2022.01)
*H05B 47/125* (2020.01)

(52) U.S. Cl.
CPC ............ *H05B 47/125* (2020.01); *B60Q 1/04* (2013.01); *B60Q 1/20* (2013.01); *B60Q 1/46* (2013.01); *G06T 7/55* (2017.01); *G06V 20/588* (2022.01); *G06T 2207/10016* (2013.01); *G06T 2207/10028* (2013.01); *G06T 2207/20081* (2013.01); *G06T 2207/20084* (2013.01); *G06T 2207/30256* (2013.01)

(58) Field of Classification Search
CPC .......... H05B 47/125; B60Q 1/04; B60Q 1/20; B60Q 1/46; G06T 7/55; G06T 2207/10016; G06T 2207/10028; G06T 2207/20081; G06T 2207/20084; G06T 2207/30256; G06V 20/588

USPC ......................................................... 382/104
See application file for complete search history.

(56) References Cited

U.S. PATENT DOCUMENTS

2020/0062180 A1* 2/2020 Stein ..................... B60S 1/0822

OTHER PUBLICATIONS

Einecke, Nils, Harsh Gandhi, and Jörg Deigmöller. "Detection of camera artifacts from camera images." 17th International IEEE Conference on Intelligent Transportation Systems (ITSC). IEEE, 2014. (Year: 2014).*
Li, Chih-Hung G., et al. "Real-time rain detection and wiper control employing embedded deep learning." IEEE Transactions on Vehicular Technology 70.4 (2021): 3256-3266. (Year: 2021).*

(Continued)

*Primary Examiner* — Jonathan S Lee
(74) *Attorney, Agent, or Firm* — Maiorana Patent Law, PA

(57) ABSTRACT

An apparatus comprises an interface and a processor. The interface may be configured to receive pixel data corresponding to an exterior view from a vehicle. The processor may be configured to process the pixel data arranged as video frames and perform computer vision operations on the video frames. The computer vision operations may be configured to detect a reference object in the video frames, calculate a first distance to the reference object during a first time period, and calculate a second distance to the reference object during a second time period. The processor may be further configured to compare the second distance to the first distance, determine a presence of a visual obstruction based on the comparison, and generate a control signal to enable a lamp in response to determining the presence of the visual obstruction.

20 Claims, 13 Drawing Sheets

(56) References Cited

OTHER PUBLICATIONS

Hautiere, Nicolas, et al. "Automatic fog detection and estimation of visibility distance through use of an onboard camera." Machine vision and applications 17.1 (2006): 8-20. (Year: 2006).*

Asundi, Pavan Kumar, and K. S. Geetha. "Raindrop detection algorithm for ADAS." 2017 2nd IEEE International Conference on Recent Trends in Electronics, Information & Communication Technology (RTEICT). IEEE, 2017. (Year: 2017).*

Aubert, Didier, et al. "Digital imaging for assessing and improving highway visibility." Proceedings of the Transport Research Arena (2014): 21. (Year: 2014).*

Yang, Mau-Tsuen, and Jing-Yu Zheng. "On-road collision warning based on multiple FOE segmentation using a dashboard camera." IEEE Transactions on Vehicular Technology 64.11 (2014): 4974-4984. (Year: 2014).*

Davis, Brian, and Max Donath. "Development of a Sensor Platform for Roadway Mapping: Part B—Mapping the Road Fog Lines." (2015). (Year: 2015).*

Fotios, S., et al. "The effect of fog on detection of driving hazards after dark." Lighting Research & Technology 50.7 (2018): 1024-1044. (Year: 2018).*

Halimeh, Jad C., and Martin Roser. "Raindrop detection on car windshields using geometric-photometric environment construction and intensity-based correlation." 2009 IEEE Intelligent Vehicles Symposium. IEEE, 2009. (Year: 2009).*

Haris, Malik, and Jin Hou. "Obstacle detection and safely navigate the autonomous vehicle from unexpected obstacles on the driving lane." Sensors 20.17 (2020): 4719. (Year: 2020).*

Kurihata, Hiroyuki, et al. "Detection of raindrops on a windshield from an in-vehicle video camera." International Journal of Innovative Computing, Information and Control 3.6 (2007): 1583-1591. (Year: 2007).*

Al Machot, Fadi, et al. "Real-time raindrop detection based on cellular neural networks for ADAS." Journal of Real-Time Image Processing 16 (2019): 931-943. (Year: 2019).*

Tan, Han-Shue, B. Bougler, and Paul Kretz. "A steering guidance system for snowplow—an interesting control problem." Proceedings of the 38th IEEE Conference on Decision and Control (Cat. No. 99CH36304). vol. 5. IEEE, 1999. (Year: 1999).*

* cited by examiner

MONITORING AND RESPONDING TO POOR VISIBILITY CONDITIONS BY ANALYZING IMAGES USING DEEP NEURAL NETWORK

FIELD OF THE INVENTION

The invention relates to computer vision generally and more particularly, to a method and/or apparatus for monitoring and responding to poor visibility conditions by analyzing images using deep neural network.

BACKGROUND

Various driving assistance features are commonplace in many vehicles today. The various driving assistance features gather information through the use of vehicle-mounted cameras and sensors. As more camera information and sensor information becomes accessible, more features (both comfort and safety) can be provided. Decision-making can be performed by utilizing camera information and sensor information from hardware already installed in vehicles.

There are still many driving problems that have not been addressed. One of these unaddressed problems is the proper use of lamps during conditions with poor visibility. Various lamps of the vehicle should be turned on during these conditions such as headlights for darkened conditions. In some situations, some lamps may be more appropriate than others, or some lamps may even make the situation worse.

It would be desirable to implement monitoring and responding to poor visibility conditions by analyzing images using deep neural network.

SUMMARY

The invention concerns an apparatus comprising an interface and a processor. The interface may be configured to receive pixel data corresponding to an exterior view from a vehicle. The processor may be configured to process the pixel data arranged as video frames and perform computer vision operations on the video frames. The computer vision operations may be configured to detect a reference object in the video frames, calculate a first distance to the reference object during a first time period, and calculate a second distance to the reference object during a second time period. The processor may be further configured to compare the second distance to the first distance, determine a presence of a visual obstruction based on the comparison, and generate a control signal to enable a lamp in response to determining the presence of the visual obstruction.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
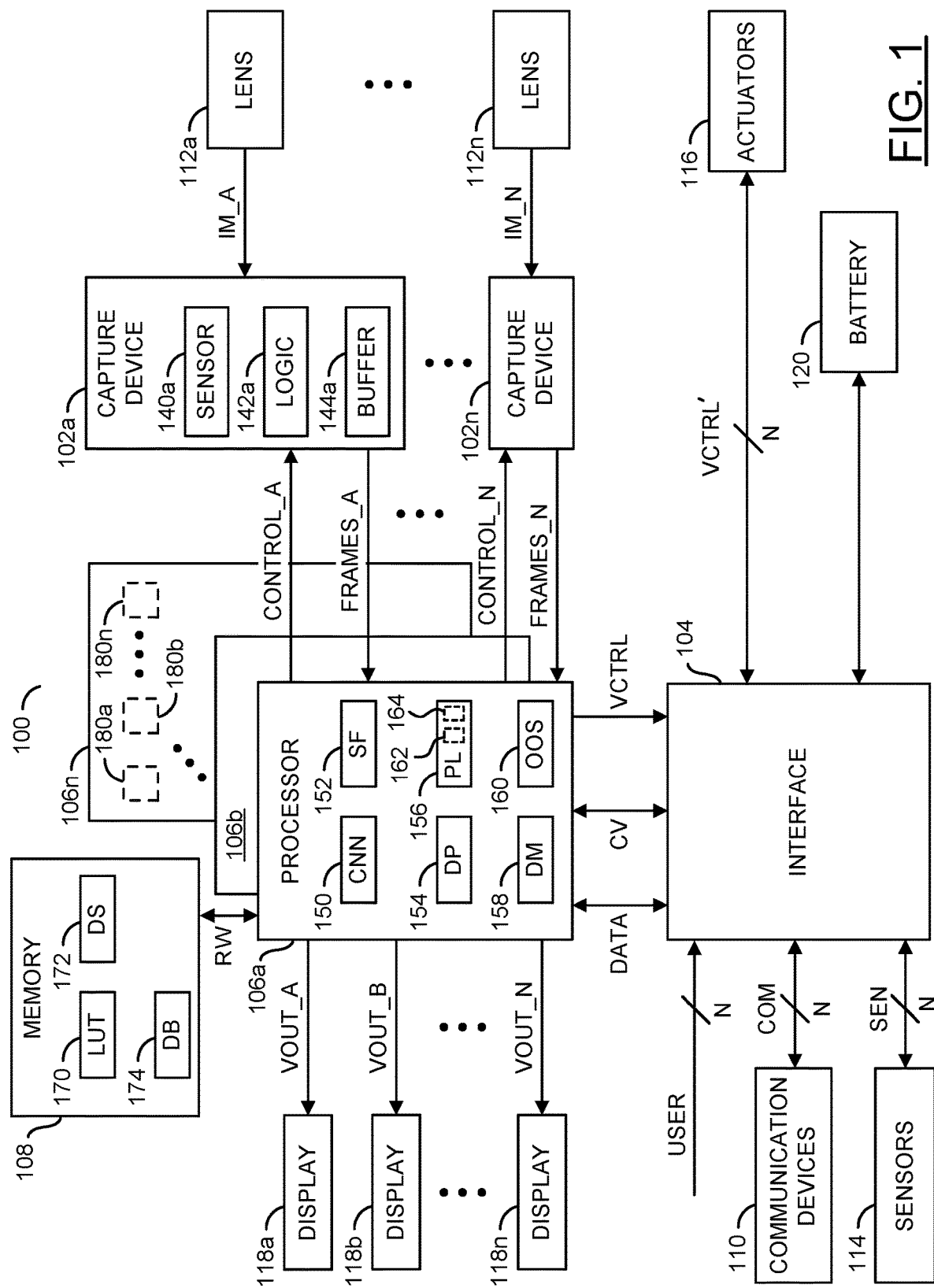
FIG. 1 is a block diagram illustrating an apparatus for monitoring and responding to poor visibility conditions in an example embodiment.

Embodiments of the present invention may comprise providing an apparatus for monitoring and responding to poor visibility conditions by analyzing images using a deep neural network that may (i) use one or more capture devices in or on a vehicle, (ii) operate as a companion device configured to control components of the vehicle, (iii) perform computer vision operations to detect poor visibility conditions, (iv) implement a neural network to perform computer vision operations locally, (v) enable or disable one or more lights of the vehicle, and/or (vi) be implemented as one or more integrated circuits.

Embodiments of the present invention may be configured to detect poor visibility conditions and enable or disable one or more lights of a vehicle. The one or more lights of the vehicle may be front fog lamps and/or rear fog lamps. In some jurisdictions, a pair of rear fog lamps may be permitted to be in use on the vehicle. In some other jurisdictions, rear fog lamps may be limited to a single fog lamp on the back of the vehicle. The front fog lamps and/or rear fog lamps may be enabled when poor visibility conditions are detected.

Embodiments of the present invention may be configured to test whether enabling one or more lights (e.g., front fog lamps, rear fog lamps, side fog lamps, etc.) of a vehicle improve visibility during poor visibility conditions. Once the one or more lights are enabled, visibility conditions may be tested again to determine if the visibility conditions improved after enabling one or more lights. If the visibility conditions did not improve, the present invention may be configured to disable any of the lights that were automatically enabled.

Computer vision operations may be implemented to determine poor visibility conditions using captured pixel data arranged as video frames. Descriptors may be calculated from feature points extracted from the video frames by analyzing pixel data. The descriptors may be compared to reference descriptors to detect objects and determine which objects correspond to repeating reference objects. A distance from the vehicle to each of these repeating reference objects may be determined. In some embodiments, an increase in the distance to a furthest identified repeated reference object may indicate an improvement in visibility conditions while a decrease in the distance to the furthest identified repeated reference object may indicate a decline in visibility conditions.

During testing whether visibility conditions improved after enabling one or more lights, a current furthest distance calculated from the vehicle to a repeated reference object may be compared to a previous furthest distance calculated from the vehicle to a repeated reference object prior to the enabling of the one or more lights. The lights may correspond to one or more front and/or rear fog lamps. If the furthest distance calculated from the vehicle to a repeated reference object has increased after enabling the one or more lights, a determination may be made that enabling the one or more lights improved visibility conditions. If the furthest distance calculated from the vehicle to a repeated reference object decreased after enabling the one or more lights, a determination may be made that enabling the one or more lights resulted in declined, reduced or deteriorated visibility conditions and the one or more lights may be disabled.

Computer vision operations may be implemented to determine whether another vehicle is behind a vehicle or approaching the vehicle from behind. Descriptors calculated from feature points extracted from the video frames by analyzing pixel data may be compared to reference descriptors to detect objects and determine which objects correspond to a rear approaching vehicle in order to calculate a distance. Two or more distance calculations in a given time period may be used to determine an approach speed of another vehicle to the rear of the vehicle. In some embodiments, a threshold distance may be used to determine that another vehicle is too close to the vehicle and that one or more rear fog lamps should be disabled to avoid dazzling or distracting a driver of the vehicle approaching from the rear.

In some embodiments, a threshold approach speed may be used to determine that one or more rear fog lamps should be disabled. A combination of a threshold distance and/or a threshold approach speed may also be used to determine if the one or more rear fog lamps should be disabled. The one or more rear fog lamps may be disabled without other lights (e.g., front fog lamps, headlights, etc.) being disabled. A determination may be made when to re-enable the disabled one or more rear fog lamps. The one or more rear fog lamps may be re-enabled when a determination is made that the rear approaching vehicle has retreated beyond a threshold distance, the rear approaching vehicle has changed lanes and increased the distance from the vehicle beyond a threshold distance, the rear approaching vehicle has left the road, the rear approaching vehicle has passed the vehicle, etc.

Referring to FIG. 1, a block diagram illustrating an apparatus 100 for monitoring and responding to poor visibility conditions is shown according to an example embodiment. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuit 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be a component separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processor 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, a light detecting device, an array of light detecting devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate and/or adjust front fog lamps/lights, activate and/or adjust rear fog lamps/lights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180*a* may schedule the operators based on when the operators may be ready to be processed by the hardware engines 180*a*-180*n*.

The scheduler circuit 180*a* may time multiplex the tasks to the hardware modules 180*a*-180*n* based on the availability of the hardware modules 180*a*-180*n* to perform the work. The scheduler circuit 180*a* may parse the directed acyclic graph into one or more data flows. Each data flow may comprise one or more operators. Once the directed acyclic graph is parsed, the scheduler circuit 180*a* may allocate the data flows/operators to the hardware engines 180*a*-180*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180*a*-180*n* may be configured to extract feature points from the video frames. The CNN module 150 may be configured to analyze pixels of the video frames and/or groups of pixels of the video frame. One or more of the dedicated hardware modules 180*a*-180*n* may be configured to perform particular mathematical operations that may be performed multiple times to perform the analysis of the pixels and/or groups of pixels. The operations performed by the dedicated hardware modules 180*a*-180*n* may be configured to calculate descriptors based on the feature points. The dedicated hardware modules 180*a*-180*n* may be configured to compare the descriptors to reference descriptors stored in the memory 108 to determine whether the pixels of the video frames correspond to a particular object.

Figure 2:
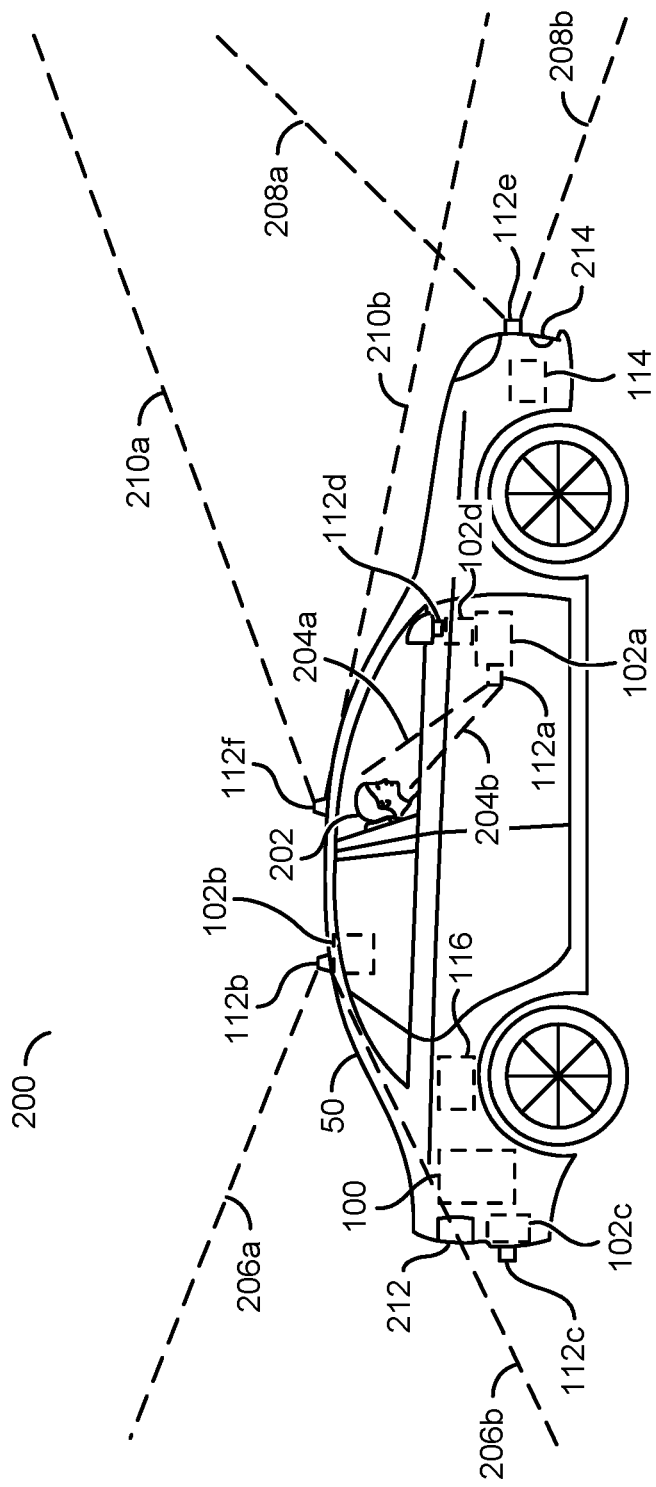
FIG. 2 is a diagram illustrating camera systems inside and outside of a vehicle in an example embodiment.

Referring to FIG. 2, a diagram illustrating camera systems 200 inside and outside of a vehicle 50 is shown according to an example embodiment. The apparatus 100 is shown as a component of the vehicle 50. In the example shown, vehicle 50 is a car. The vehicle 50 may be an ego vehicle. In some embodiments, the vehicle 50 may be a car, a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102*a*-102*d* and/or sensors 114 such as a direct wired connection and/or a connection using a common bus line). A location of the apparatus 100 may be varied according to the design criteria of a particular implementation.

A camera (e.g., the lens 112*a* and the capture device 102*a*) is shown capturing an interior of the vehicle 50 (e.g., detecting the driver 202). A targeted view of the driver 202 (e.g., represented by a line 204*a* and a line 204*b*) is shown being captured by the capture device 102*a*. The capture device 102*a* may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106*a*-106*n* may determine a body position and/or body characteristics (e.g., a distance, orientation and/or location of the body and/or head) of one or more occupants of the vehicle 50 and/or objects within the vehicle 50.

In some embodiments, more than one of the capture devices 102*a*-102*n* may be used to capture video data of the driver 202 and/or other occupants of the vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112*c* and the capture device 102*c*) is shown capturing a targeted view from the vehicle 50. In the example shown, the targeted view from the vehicle 50 (e.g., represented by a line 206*a* and a line 206*b*) is shown capturing an exterior view to the rear of (e.g., an area behind) the vehicle 50. Similarly, other cameras may be used to capture video data of a targeted view from the vehicle (e.g., shown as the lens 112*c* and the capture device 102*c*, the lens 112*d* and the capture device 102*d*, etc.). For example, the targeted view (e.g., represented by a line 208*a* and a line 208*b* captured by the lens 112*e*) may provide a front exterior view of an area. In another example, a redundant targeted view (e.g., represented by a line 210*a* and a line 210*b* captured by the lens 112*f*) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102*a*-102*n* may be configured to capture video data of the environment around (e.g., area near) the vehicle 50. The processors 106*a*-106*n* may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106*a*-106*n* to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106*a*-106*n* may be varied according to the design criteria of a particular implementation.

The processors 106*a*-106*n* may be configured to analyze the captured video signal. The processors 106*a*-106*n* may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50 was parked, when the vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
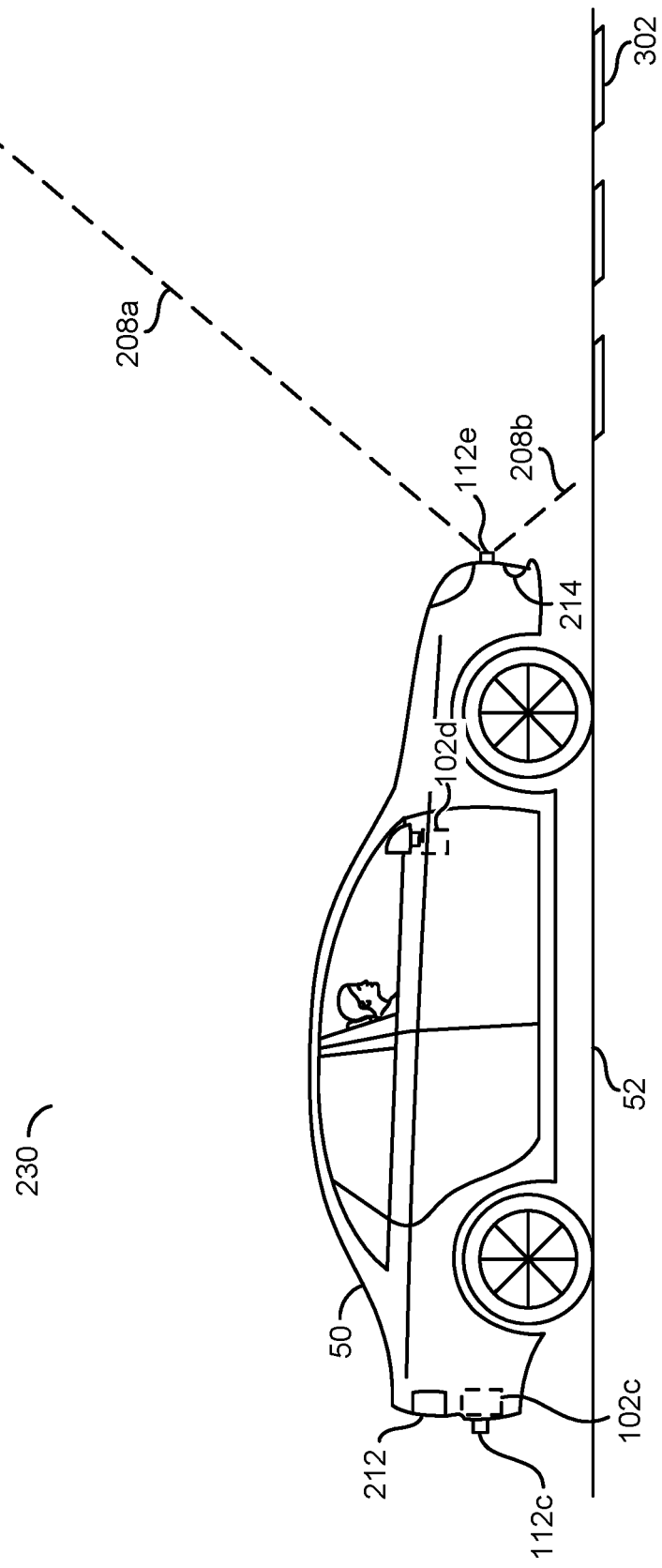
FIG. 3 is a diagram illustrating a side view of an example vehicle driving on a road with road markings.

Referring to FIG. 3, a diagram illustrating a side view 230 of an example vehicle 50 driving on a road with road markings 302 is shown. The vehicle 50 is shown driving on a surface 52. The surface 52 may be a road. The road 52 may be a paved road with periodic road markings 302.

The vehicle 50 is shown having the rear lens 112c and the front lens 102d. The front field of view 208a-208b is shown. The capture device 102e may capture video data of the environment near the vehicle 50 within the field of view 208a-208b.

The vehicle 50 is shown having a rear fog lamp (or lamps) 212 and a front fog lamp (or lamps) 214. In some jurisdictions, there may be two rear fog lamps 212. The rear fog lamps 212 and the front fog lamps 214 may be manually turned on and off by the driver 202. In some embodiments, the processors 106a-106n may generate the signal VCTRL to a vehicle system (e.g., the actuator 116). In an example, the signal VCTRL may provide a control signal that enables or disables one or more of the rear fog lamps 212 and/or the front fog lamps 214. In another example, the processors 106a-106n may analyze video frames to determine that visual conditions have deteriorated and passed a threshold level where one or more of the rear fog lamps 212 and/or the front fog lamps 214 should be enabled. The processors 106a-106n may further determine that enabling the one or more of the rear fog lamps 212 and/or the front fog lamps 214 did not improve visual conditions or resulted in worse visual conditions and disable the one or more of the rear fog lamps 212 and/or the front fog lamps 214 as a result. In another example, the processors 106a-106n may analyze video frames to determine that another vehicle is approaching from the rear and is close enough such that the rear fog lamps 212 should be disabled to prevent a driver of a rear approaching vehicle from being distracted and/or dazzled. The processors 106-106n may then generate the signal VCTRL to disable one or more of the rear fog lamps 212 while leaving the front fog lamps 214 enabled.

The road markings 302 are shown within the field of view 208a-208b. In the example shown, the vehicle 50 may be moving in a forward direction on the road 52 with reoccurring consistent road reference objects (e.g., the road markings 302) entering and exiting the field of view 208a-208b as the vehicle 50 moves forward. The apparatus 100 may be configured to capture video frames of reoccurring reference objects. The apparatus 100 may be configured to perform computer vision to detect the reoccurring reference objects (e.g., the road markings 302). The apparatus 100 may be configured to analyze the detected object (e.g., the road marking 302) and/or determine characteristics of the detected object.

Figure 4:
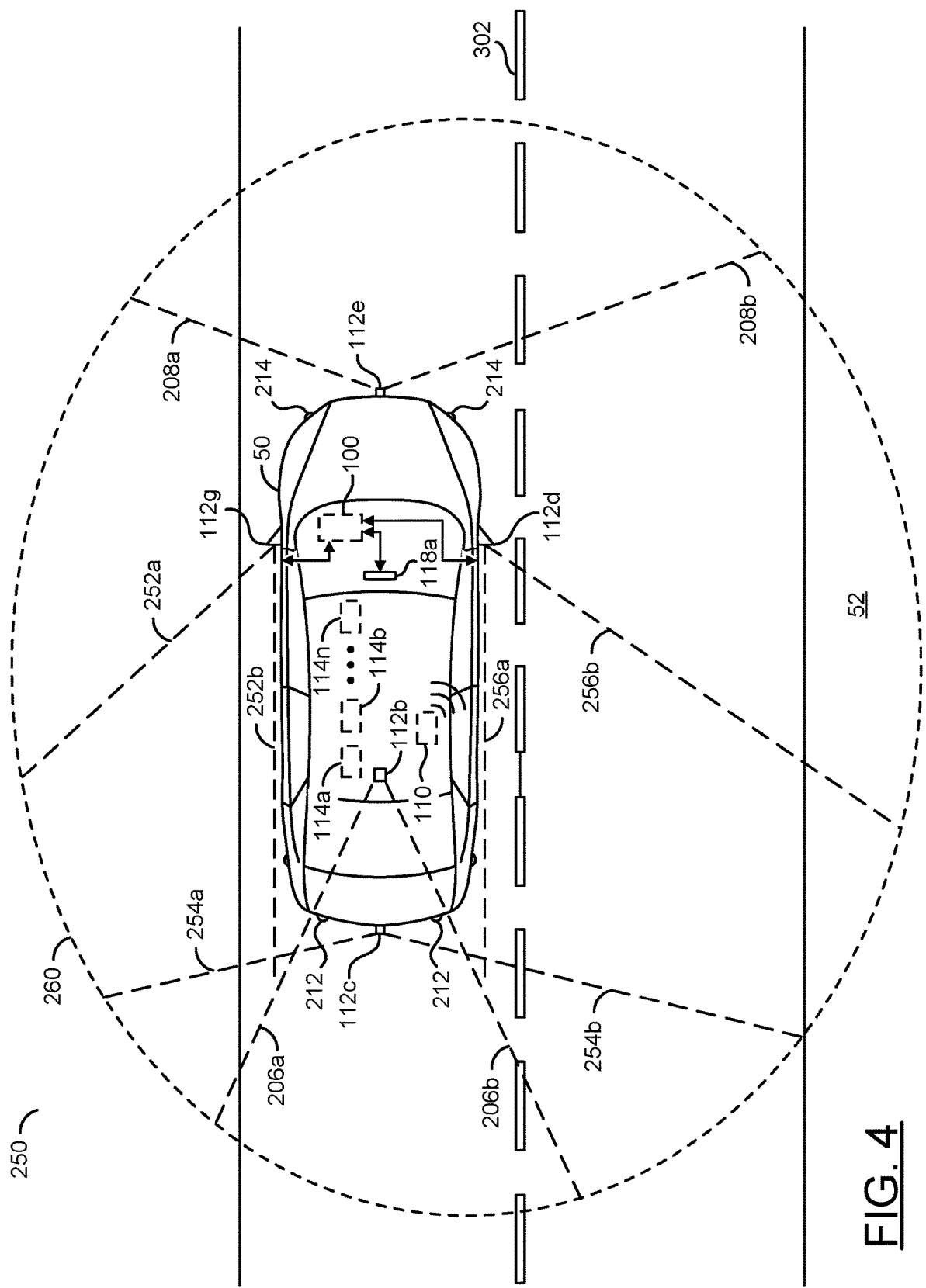
FIG. 4 is a diagram illustrating an example 360 degree field of view of a vehicle captured by a camera system.

Referring to FIG. 4, a diagram illustrating an example 360 degree field of view of a vehicle captured by a camera system is shown. An overhead view 250 of the vehicle 50 is shown. The apparatus 100 is shown within the vehicle 50. The communication device 110 is shown. The lenses 112a-112g are shown on the vehicle 50. The rear fog lamps 212 and the front fog lamps 214 are shown on the vehicle. In some jurisdictions, the number of fog lamps may vary. For example, there may be only one rear fog lamp 212. The display 118a is shown within the vehicle 50. While only one of the displays 118a is shown as a representative example, generally the vehicle 50 may comprise more than one of the displays 118a-118n.

Each of the lenses 112a-112g may be directed to capture a different field of view. As shown in association with FIG. 2, the lens 112b may capture the field of view 206a-206b and the lens 112e may capture the field of view 208a-208b. Dotted lines 252a-252b are shown. The dotted lines 252a-252b may represent the field of view captured by the lens 112g (shown directed towards a rear of the vehicle 50 from the driver side mirror location). Dotted lines 254a-254b are shown. The lines 254a-254b may represent the field of view captured by the lens 112c (shown directed behind the vehicle 50 from the rear bumper location). Dotted lines 256a-256b are shown. The lines 256a-256b may represent the field of view captured by the lens 112d (shown directed towards a rear of the vehicle 50 from the passenger side mirror location). In an example, each of the fields of view captured by the lenses 112a-112g may be presented as video data to the displays 118a-118n and/or analyzed by the processors 106a-106n. The lenses 112a-112g and the corresponding fields of view (e.g., the fields of view 206a-206b, 208a-208b, 210a-210b, 252a-252b, 254a-254b and 256a-256b) are shown as an illustrative example. More lenses (e.g., the lenses 112a-112n) and/or fields of view may be captured by the apparatus 100.

A dotted circle 260 is shown. The dotted circle 260 may represent an exterior field of view from the perspective of the vehicle 50 captured by the apparatus 100. The processors 106a-106n may be configured to combine the video data captured by the capture devices 102a-102n to form the exterior field of view 260. The exterior field of view 260 may be a 360 degree field of view (e.g., a field of view that captures video data in all or most directions around the vehicle 50, a field of view that surrounds the vehicle 50, etc.). The lenses 112a-112g and the corresponding fields of view (e.g., the fields of view 206a-206b, 208a-208b, 210a-210b, 252a-252b, 254a-254b and 256a-256b) and/or data from other lenses (e.g., the lenses 112h-112n, not shown) may be combined to enable the processors 106a-106n to have access to video data over the full 360 degree field of view 260.

In some embodiments, the processors 106a-106n may be configured to perform video stitching operations and/or de-warping operations to form the 360 degree field of view 260. In some embodiments, the processors 106a-106n may be configured to analyze the video data captured by each of the capture devices 102a-102n and aggregate the results to make inferences about all the video data in the 360 degree field of view 260 (e.g., the video data from each field of view may be analyzed individually, and the results may be combined to effectively create the 360 degree field of view 260, even if a single video stream of all 360 degrees around the vehicle 50 is never actually created).

While a generally circular shape for the 360 degree field of view 260 is shown, the particular shape of the 360 degree field of view 260 may not be circular. For example, the range of each of the capture devices 102a-102n may be different. In another example, the physical location of the capture devices 102a-102n on the vehicle 50 may determine how far from the vehicle 50 the field of view 260 is able to reach. The 360 degree field of view may have an irregular shape. The circular shape of the 360 degree field of view 260 is shown for illustrative purposes. For example, the range of the 360 field of view 260 may extend farther from the vehicle 50 than shown. In some embodiments, the 360 degree field of view 260 may be spherical (e.g., capture the environment above the vehicle 50). In some embodiments, the field of view 260 may not be a full 360 degree field of view (e.g., locations below the vehicle 50 may not be captured).

The processors 106a-106n may be further configured to perform computer vision operations on the video data captured in the 360 degree field of view 260 (which may provide an approximation of what the driver 202 would be able to see if the driver 202 was in the vehicle 50 and looking in multiple directions simultaneously) and more. For example, the computer vision operations performed by the processors 106a-106n may be configured to detect and/or recognize objects. The computer vision operations performed by the processors 106a-106n may be further configured to detect characteristics of objects and/or changes to the characteristics over time.

The sensor fusion module 152 may be configured to combine information about the objects detected from analyzing the video data captured with a detection of objects using the proximity sensors (e.g., one or more of the sensors 114 configured to implement radar, lidar, etc.). The sensor fusion module 152 may be further configured to mathematically weight the information received from the computer vision operations (e.g., modify coefficients to represent how likely the detections made by the computer vision operations are correct based on the detections made by the proximity sensors). For example, the sensor fusion module 152 may be configured to mathematically weight the information provided by each sensor (e.g., a confidence level of the computer vision detection, a confidence level of the detection of the sensors 114, the distance limitations of the sensors 114, whether the computer vision detects the object at a distance beyond the range of the sensors 114, etc.). The vehicle 50 may implement the apparatus 100 that enables computer vision and 360 degree cameras to provide the exterior field of view 260 combined with additional information from the sensors 114 (e.g., such as ultrasonics, radars, gyroscope, accelerometer, etc.).

The processors 106a-106n may be configured to detect events. In some embodiments, the event may be information that warrants being brought to the attention of the driver 202. In some embodiments, the event may be information about the nearby vehicles. In some embodiments, the event may be a detected scenario that the apparatus 100 should react to (e.g., avoid collisions, provide warnings, store information, avoid roadway hazards such as potholes, elevated surfaces, declined surfaces, etc.). For example, whether a detected scenario is considered an event may be determined by the decision module 158. In one example, the event may correspond to detecting that another vehicle is approaching from the rear and is approaching a distance where a rear fog lamp 212 should be disabled. In one example, the event may correspond to detecting that another vehicle, a pedestrian, a speed bump or another obstacle may be on a collision course with the vehicle 50. The events may be detected based on the computer vision operations performed on the video data captured using the lenses 112a-112n. The events may be detected based on readings from the sensors 114. For example, the sensor fusion module 152 may be configured to combine information determined using the computer vision operations and information detected using the sensors 114 to make inferences that may be used by the decision module 158.

The processors 106a-106n may be configured to detect the road markings 302 using the computer vision operations. Using the computer vision operations, the processors 106a-106n may determine a calculated length and width and/or distance to each road marking 302 in the 360 degree field of view 260. In some embodiments, the processors 106a-106n may be configured to measure the boundaries of the road markings 302 to measure the number of pixels between the boundaries to calculate length and width.

Figure 5:
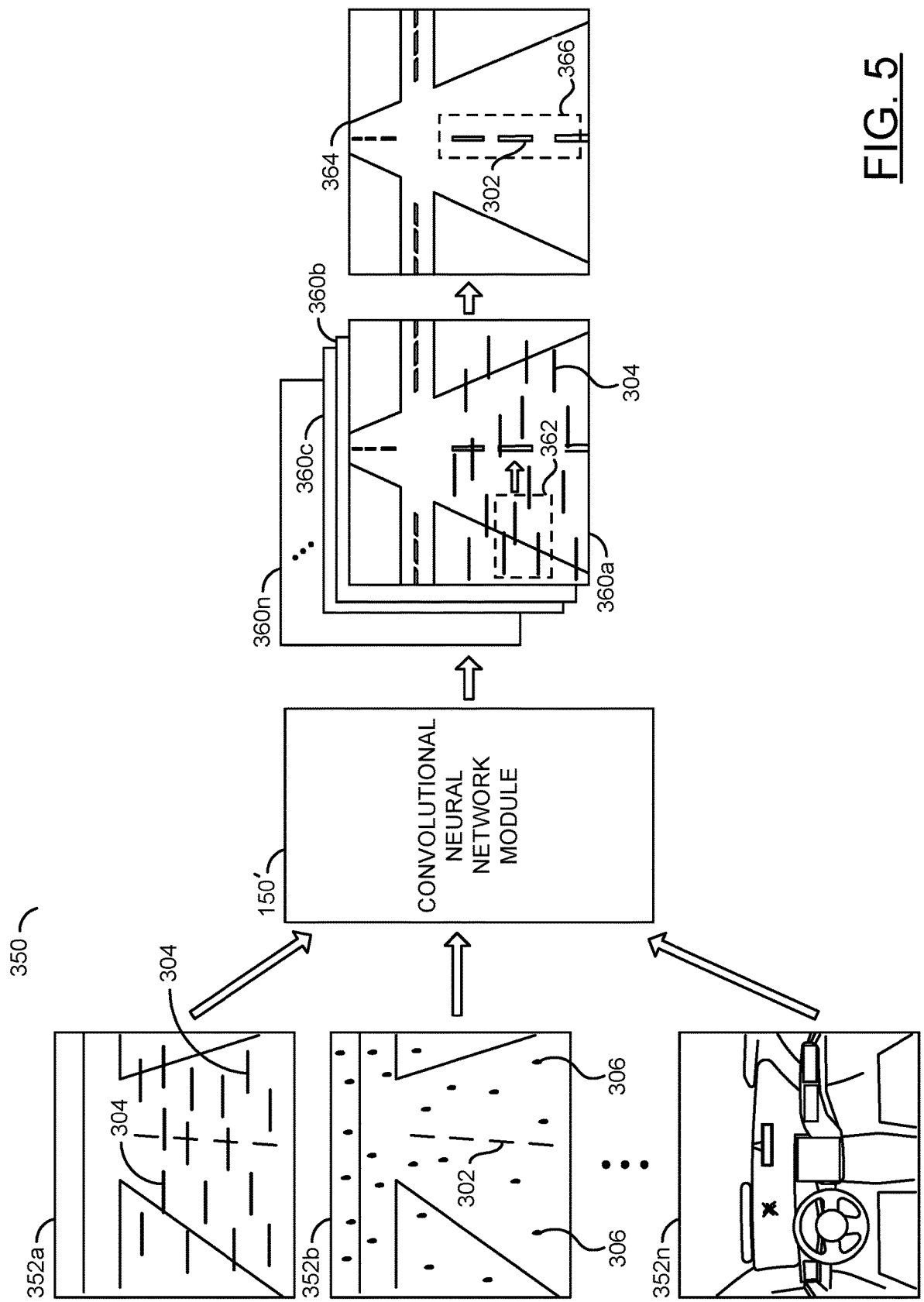
FIG. 5 is a diagram illustrating an example visualization of training a convolutional neural network for object detection using fleet learning.

Referring to FIG. 5, a diagram illustrating an example visualization of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n (e.g., a machine learning model) may be pre-programmed and/or loaded into the processors 106a-106n. The processors 106a-106n may conduct inferences against the machine learning model (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In an example shown, the training data 352a-352n may be of capture video data (e.g., captured from a front camera of the vehicle 50) of a road including the road markings 302 in various conditions that may obscure visibility. For example, the training data 352a may be a video frame or sequence of video frames showing a reference object 302 (e.g., road markings 302 on a road)

obscured (or partially obscured) by a visual obstruction 304 (e.g., fog). In another example, the training data 352b may be a video frame or sequence of video frames showing a road with the road markings 302 obscured (or partially obscured) by a visual obstruction 306 (e.g., rain). In another example, the training data 352b may be a video frame or sequence of video frames (e.g., captured from an interior camera of vehicle 50) showing what is approaching the vehicle 50 in the rear view mirror. The training data 352a-352n may be labeled based on whether the prediction was incorrect or correct. Using the training data 352a-352n (e.g., video frames captured from many different vehicles as the vehicles are produced, as different vehicles are deployed on the roads, etc.), many training data sets may be available to train the CNN module 150'. In an example, different makes and models of vehicles may be analyzed. In another example, different interior colors may be analyzed. In yet another example, different drivers (e.g., different people) may be analyzed. In still another example, different driving scenes (e.g., flat surfaces, clear weather, dark scenes, etc.) may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features, vehicles, pedestrians, etc.) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may receive and analyze input images (e.g., the training data 352a-352n) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may comprise a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 364. The reference video frame 364 may comprise masks and/or categorized instances of the reference objects 366. The reference objects 366 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In some embodiments, the machine learning may be performed by the centralized CNN module 150'. Generally, the processing capabilities and/or computing resources available to the centralized CNN module 150' (e.g., implemented as part of a cloud computing network) may be greater than the processing capabilities and/or computing resources available to the CNN module 150 implemented by the processors 106a-106n. For example, the centralized CNN module 150' may perform the machine learning using the training data 352a-352n, develop a machine learning model, and then provide the machine learning model to each apparatus 100 in a fleet of vehicles. The CNN module 150' may continue to receive the training data 352a-352n from each apparatus 100, refine the machine learning model, and then provide updates to the machine learning model for each apparatus 100. The centralized CNN module 150' may develop, refine and/or enhance the machine learning model by receiving input (e.g., the training data 352a-352n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning model adapted to the constraints of the edge device. The processors 106a-106n may be configured to compress the machine learning model (e.g., compressed compared to the machine learning model implemented by the centralized CNN module 150'). In an example, compressing the machine learning model may comprise quantization, pruning, sparsification, etc. Compressing the machine learning model may enable the CNN module 150 to perform the machine learning and/or conduct inferences against the machine learning model (e.g., object detection). By performing the machine learning at the edge (e.g., locally on the processors 106a-106n), there may be reduced latency compared to performing wireless communication with the centralized CNN module 150'. Similarly, the apparatus 100 may be able to perform the machine learning without maintaining a wireless connection. By performing the machine learning at the edge, privacy may be maintained since the training data 352a-352n would be kept local. Whether the machine learning is performed locally (e.g., at the edge), performed using a centralized resource and/or performed using a combination of local and centralized resources may be varied according to the design criteria of a particular implementation.

Figure 6:
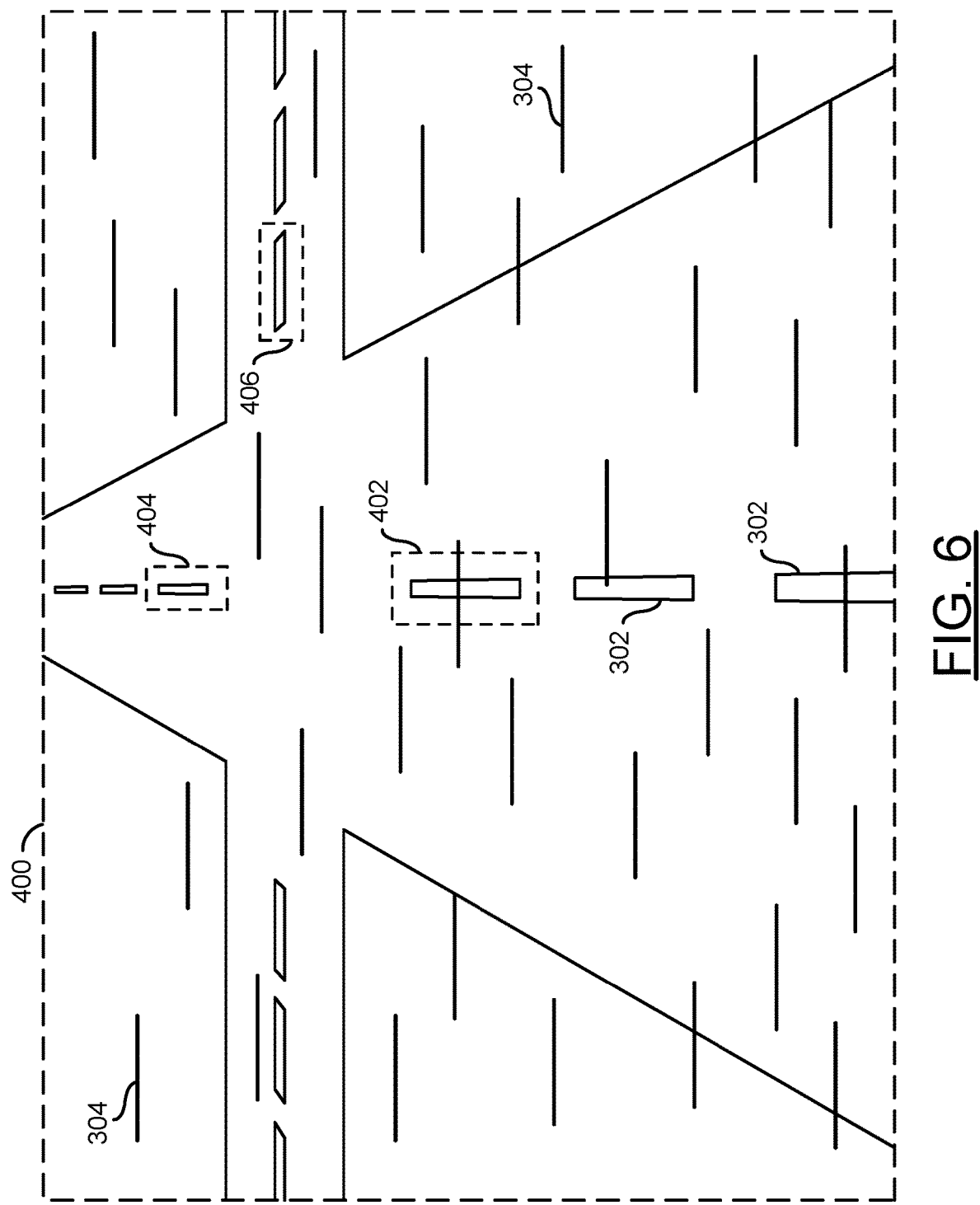
FIG. 6 is a diagram illustrating an example object detection being performed on a video frame in order to determine visibility conditions.

Referring to FIG. 6, a diagram illustrating an example object detection being performed on a video frame 400 in order to determine visibility conditions is shown. The example video frame 400 may comprise pixel data captured by one or more of the capture devices 102a-102n. In one example, the video frame 400 may be provided to the processor 106a-106n as the signal FRAMES_A-FRAMES_N. In another example, the video frame 400 may be generated by the processors 106a-106n in response to the pixel data provided in the signal FRAMES_A-FRAMES_N. The pixel data may be received by the processors 106a-106n and video processing operations may be performed by the video processing pipeline 156 to generate the example video frame 400. In some embodiments, the example video frame 400 may be presented as human viewable video output to one or more of the displays 118a-118n. In some embodiments, the example video frame 400 may be utilized internal to the processor 106a-106n to perform the computer vision operations.

The example video frame 400 may comprise a view of a road obscured by the visual obstruction 304. In the example shown, the visual obstruction 304 may comprise fog. The fog 304 is shown in FIG. 6 for example purposes only and other visual obstructions (e.g., rain, snow, smoke, etc.) may also be the cause of the obscured road. The example video frame 400 may represent a video frame captured by a front, rear, side, or interior mounted one of the capture devices 102a-102n.

Dotted shapes 402, 404, and 406 are shown. The dotted shapes, 402, 404, and 406 may represent the detection of objects by the computer vision operations performed by the processors 106a-106n. The dotted shapes 402, 404, and 406 may comprise the pixel data corresponding to an object detected by the computer vision operations pipeline 156 and/or the CNN module 150. The dotted shapes 402, 404, and 406 are shown for illustrative purposes. In an example, the dotted shapes 402, 404, and 406 may be a visual representation of the object detection (e.g., the dotted shapes 402, 404, and 406 may not appear on an output video frame displayed on one of the displays 118a-118n). In another example, the dotted shapes 402, 404, and 406 may be a bounding box generated by the processors 106a-106n displayed on the video frame to indicate that an object has been detected (e.g., the bounding boxes 402, 404, and 406 as well as other bounding boxes surrounding detected objects may be displayed in a debug mode of operation). The number and/or types of objects detected by the processors 106a-106n may be varied according to the design criteria of a particular implementation.

The object 402 detected may be a road marking 302 that is close to the vehicle 50. The object 404 detected may be an additional road marking 302 that is further away from the vehicle 50. The object 406 detected may be an additional road marking 302 that is further away from the vehicle 50 but is also determined not to match in orientation or alignment with the other road markings 302. In some embodiments, a reference object may still be used for a distance measurement for detecting a level of visual obstruction even if the reference object does not match the orientation or alignment of other road markings 302 being used (e.g., the object 406). For example, the processors 106a-106n may be configured to perform operations to determine a distance to each of the detected road markings 302 based on known characteristics (e.g., shape, length, width, etc.) of the road markings 302.

Various characteristics may be determined by the processors 106a-106n, for example, by measuring the number of pixels between boundaries of a road marking 302 to determine an apparent length and width and comparing to a known length and width to determine distance. In some embodiments, the processors 106a-106n may be configured to determine the various characteristics based on a representative example road marking 302. The representative example road marking may be chosen due to proximity to the vehicle 50. In some embodiments, the processors 106a-106n may be configured to store the known characteristics of the road markings 302 according to a location. For example, GPS/GNSS data may be stored along with characteristics of the road marking 302 for a corresponding road and/or location.

The computer vision operations may be configured to detect a level (e.g., an amount of visibility reduced, a density, a thickness, etc.) of visual obstruction (e.g., detect a level of the fog 304). In some embodiments, the processors 106a-106n may be configured to detect a furthest distance to an identified road marking 302 to detect a level of the visual obstruction 304 where a shortened furthest distance to an identified road marking 302 may mean an increase in a level of visual obstruction. The detection of a level of visual obstruction may be accomplished by detecting a change of conditions causing a decrease in the furthest distance to an identified road marking 302. The processors 106a-106n may be further configured to take into account other data. For example, a change in light level, detection of a change in a road traveled on, total or partial blockage of the camera, etc. that may affect the distance calculation. The detection of change in the road traveled on may be accomplished with data from GPS/GNSS data, orientation data, speed data, etc. For example, GPS/GNSS data indicates that the driver of vehicle 50 has exited a first road comprising a first type of road marking 302 and is now traveling on a second road comprising a second type of road marking 302 with different characteristics.

The processors 106a-106n may be configured to perform operations to enable one or more of the front fog lamps 214 and/or the rear fog lamps 212. For example, a level of the visual obstruction 304 may pass a predetermined threshold in order to perform operations to enable the front fog lamps 214. In another example, a level of the visual obstruction 304 may pass a predetermined threshold in order to perform operations to enable both the front fog lamps 214 and the rear fog lamps 212. In a further example, a level of visual obstruction may decrease and pass a predetermined threshold such that the processors 106a-106n are configured to disable one or more front fog lamps 214 and/or rear fog lamps 212.

The processors 106a-106n may be configured to perform operations to enable one or more of the front fog lamps 214 and/or the rear fog lamps 212 and further test whether such enablement improves a level of visual obstruction (e.g., determine a continuing status). For example, operations are performed to determine a level of visual obstruction, enable one or more of the front fog lamps 214 and/or the rear fog lamps 212, and determine if the level of visual obstruction has decreased after the enablement.

After enabling one or more of the rear fog lamps 212 and/or the front fog lamps 214, the processors 106a-106n may continue to monitor the level of the visual obstruction 304 to determine the continuing status. The processors 106*a*-106*n* may be configured to determine a distance for the level of the visual obstruction 304 (e.g., similar to determining the level of the visual obstruction 304 when determining whether to enable the rear fog lamp 212 and/or the front fog lamps 214). For example, the processors 106*a*-106*n* may determine the distance to the reference object 302 during a time period while the lamp is enabled.

To determine the continuing status, the processors 106*a*-106*n* may compare the distance detected while the lamp is enabled to the distance used when determining to enable the lamp. The continuing status for the lamp may be determined in response to the comparison. In one example, if the distance determined with the lamp enabled is greater than the distance used for enabling the lamp (e.g., visibility has improved, the level of the visual obstruction 304 has been reduced, etc.), the continuing status may be set to enable the lamp (e.g., leave the rear fog lamp 212 and/or the front fog lamp 214 enabled). In another example, if the distance determined with the lamp enabled is less than (or equal to) the distance used for enabling the lamp (e.g., visibility has not improved, visibility has become worse, the level of the visual obstruction 304 has increased, etc.), the continuing status may be set to disable the lamp (e.g., leave the rear fog lamp 212 and/or the front fog lamp 214 enable). The processors 106*a*-106*n* may be configured to generate the signal VCTRL in response to the continuing status changing to disabled. The signal VCTRL may be configured to turn off one or more of the rear fog lamps 212 and/or the front fog lamps 214 in response to the continuing status being set to disabled.

Figure 7:
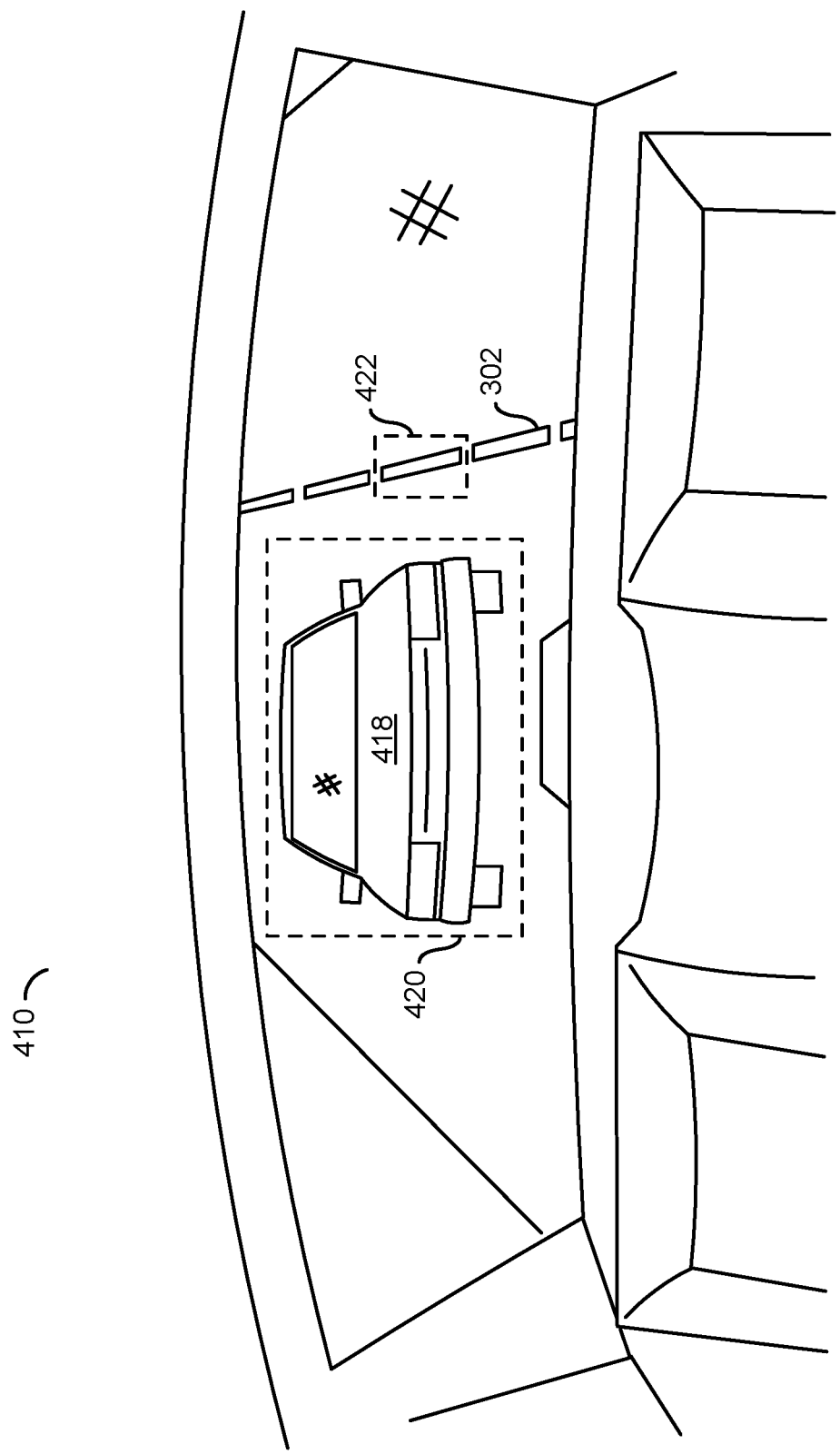
FIG. 7 is a diagram illustrating an example object detection being performed on a video frame oriented to the rear of a vehicle.
Figure 8:
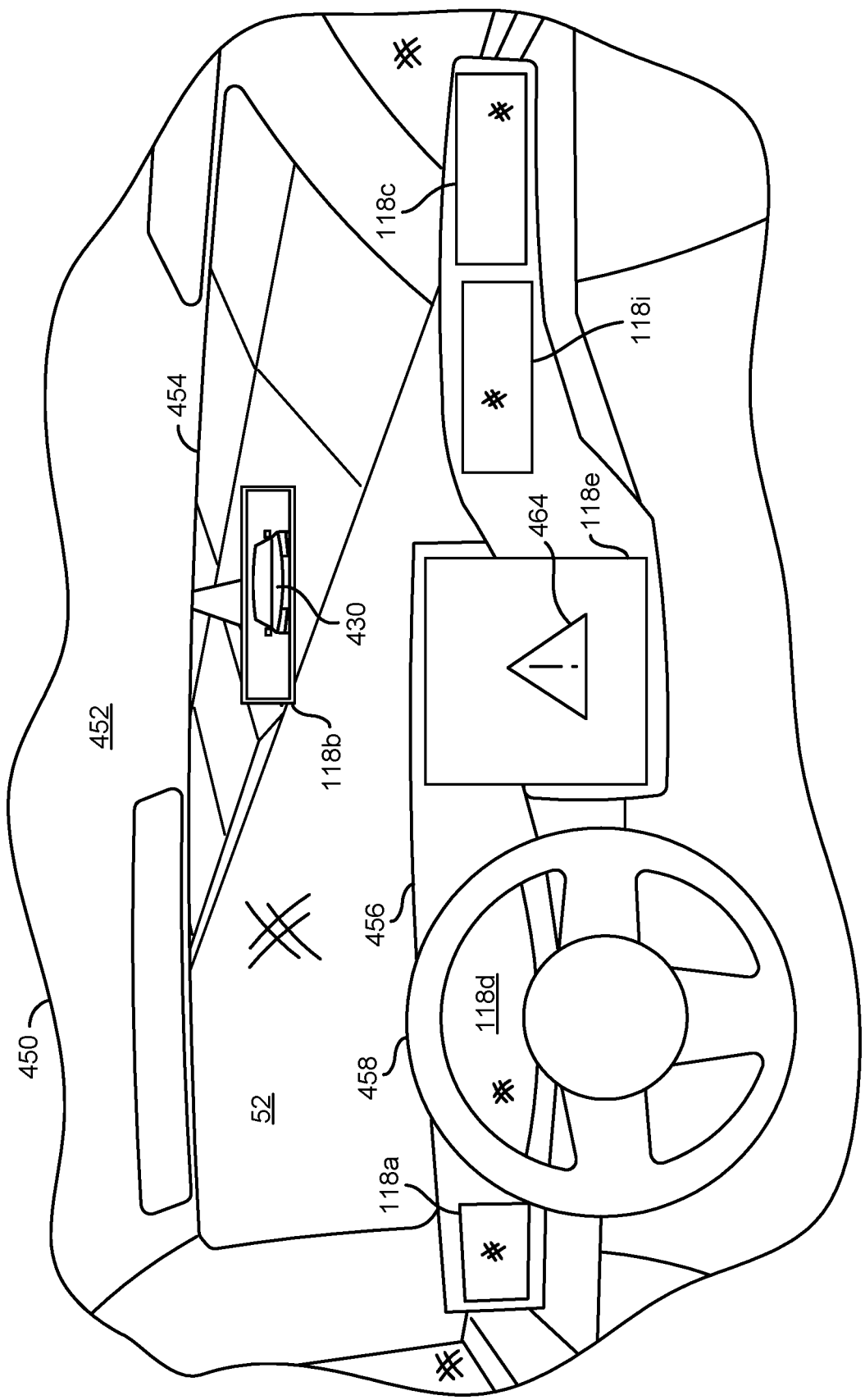
FIG. 8 is a diagram illustrating an example object detection being performed on a video frame oriented towards a rear view mirror of a vehicle.

Referring to FIG. 7, a diagram illustrating an example object detection being performed on a video frame 410 oriented to the rear of a vehicle is shown. The example video frame 410 may comprise a rear view of a road with an approaching vehicle 418. The approaching vehicle 418 shown in FIG. 7 is for example purposes only and other types of vehicles may also be approaching from the rear of the vehicle 50. The example contents of the video frame 410 may represent a video frame captured by an interior one of the capture devices 102*a*-102*n* oriented to capture a rear view. In some embodiments, the example contents of video frame 410 may represent a video frame captured by a rear mounted one of the capture devices 102*a*-102*n* that does not capture any views of the interior of the vehicle 50 (e.g., captured by the capture device 102*c* located on a rear end of the vehicle 50). In some embodiments, the example contents of video frame 410 may represent a video frame captured by an interior one of the capture devices 102*a*-102*n* oriented to capture a front view and a portion of the video frame 410 may comprise a rear view obtained from a rear-view mirror 118*b* (as illustrated in FIG. 8 showing a perspective with a mirror image of an approaching car 430).

Dotted shapes 420 and 422 are shown. The dotted shapes, 420 and 422 may represent the detection of objects by the computer vision operations performed by the processors 106*a*-106*n*. The dotted shapes 420 and 422 may comprise the pixel data corresponding to an object detected by the computer vision operations pipeline 156 and/or the CNN module 150. The dotted shapes 420 and 422 are shown for illustrative purposes. In an example, the dotted shapes 420 and 422 may be a visual representation of the object detection (e.g., the dotted shapes 420 and 422 may not appear on an output video frame displayed on one of the displays 118*a*-118*n*). In another example, the dotted shapes 420 and 422 may be a bounding box generated by the processors 106*a*-106*n* displayed on the video frame to indicate that an object has been detected (e.g., the bounding boxes 420 and 422 as well as other bounding boxes surrounding detected objects may be displayed in a debug mode of operation). The number and/or types of objects detected by the processors 106*a*-106*n* may be varied according to the design criteria of a particular implementation.

The object 420 detected may be the rear approaching vehicle 418. The rear approaching vehicle 418 may be within a certain closing distance of the vehicle 50. The object 422 detected may be an additional road marking 302. In some embodiments, the object 422 may be part of the analysis described in association with FIG. 6 determining a level of visual obstruction. In some embodiments, the processors 106*a*-106*n* may be configured to perform operations to determine a distance to the approaching vehicle 418. The distance calculation may be based on known characteristics of the approaching vehicle 418 (e.g., based on type of vehicle, model of vehicle, make of vehicle, etc.). In some embodiments, the distance calculation may be based on individual components of the approaching vehicle 418. For example, the distance calculation may be based on a relative size calculation of a headlight of the approaching vehicle 418. In another example, the distance calculation may further comprise a calculation of various characteristics (e.g., shape, length, width, etc.) of a windshield of the approaching vehicle 418. The calculations of the various characteristics may be used and combined with the determination of the type of vehicle, model of vehicle, make of vehicle, etc. In some embodiments, the distance calculation may be further based on the proximity of a reference object with known characteristics (e.g., the characteristics of a road marking 302 near the approaching vehicle 418 are known).

In some embodiments, the processors 106*a*-106*n* may be configured to perform operations to determine a closing speed of the approaching vehicle 418. The closing speed calculation may be based on two or more distance calculations within a known period of time. In some embodiments, the closing speed calculation may be based on two or more calculations of an apparent size of the approaching vehicle 418. In some embodiments, the closing speed calculation may be based on two or more calculations of an apparent size of one or more components of the approaching vehicle 418. For example, the apparent size of one or more components of the approaching vehicle 418 may use a relative size calculation of a headlight of the approaching vehicle 418. In another example, the distance calculation may comprise two or more calculations of the various characteristics (e.g., shape, length, width, etc.) of a windshield of the approaching vehicle 418 within a period of time.

The processors 106*a*-106*n* may be configured to perform operations to enable one or more of the front fog lamps 214 and/or the rear fog lamps 212. For example, a level of the visual obstruction 304 may pass a predetermined threshold in order to perform operations to enable the front fog lamps 214. In another example, a level of the visual obstruction 304 may pass a predetermined threshold in order to perform operations to enable both the front fog lamps 214 and the rear fog lamps 212. In a further example, a level of the visual obstruction 304 may decrease and pass a predetermined threshold such that the processors 106*a*-106*n* are configured to disable one or more of the front fog lamps 214 and/or the rear fog lamps 212.

In some embodiments, the processors 106*a*-106*n* may be configured to perform operations to disable one or more of the rear fog lamps 212 based on the approaching rear vehicle 418. For example, the one or more rear fog lamps 212 may be disabled based on a calculated distance from the vehicle 50 to the approaching rear vehicle 418. In another example, the one or more rear fog lamps 212 may be disabled based on a calculated closing speed of the approaching rear vehicle 418 to the vehicle 50. The one or more rear fog lamps 212 may also be disabled based on a combination of calculated distance and calculated closing speed. The one or more rear fog lamps 212 may be enabled again when certain conditions are met. In an example, conditions for enabling the one or more rear fog lamps 212 may comprise the approaching rear vehicle 418 retreating to a distance that meets a predetermined threshold, the approaching rear vehicle 418 passing the vehicle 50, the approaching rear vehicle 418 exiting the roadway, etc.

In some embodiments, the processors 106a-106n may be configured to perform operations to disable one or more of the rear fog lamps 212 and/or one or more of the front fog lamps 214 based on a detection of a visual alert. For example, the one or more rear fog lamps 212 and/or the one or more front fog lamps 214 may be turned off upon a detection of flashing high beams of another vehicle. A pattern of flashes may also be taken into account (e.g., two flashes in rapid succession). A determination on which fog lamp(s) to disable may be based on whether the flashing high beams are coming from an oncoming vehicle or from a vehicle behind the vehicle 50. For example, if a determination is made that an oncoming vehicle is flashing high beams, one or more of the front fog lamps 214 may be turned off or disabled. In another example, if a determination is made that the rear approaching vehicle 418 is flashing high beams, one or more of the rear fog lamps 212 may be turned off or disabled. The disablement of the one or more rear fog lamps 212 and/or the one or more front fog lamps 214 may be temporary. For example, the one or more fog lamps may be automatically turned on again once the oncoming vehicle or the rear approaching vehicle 418 has passed the vehicle 50. In another example, the one or more fog lamps may be automatically turned on again after a predetermined period of time. Other visual alerts that indicate that one or more of the front fog lamps 214 and/or one or more of the rear fog lamps 212 are problematic may also be utilized. For example, various hand waves and/or hand gestures may be detected as the visual alert. Other lamps of the vehicle 50, such as headlights, including headlights with high beams turned on, could also be automatically disabled.

Referring to FIG. 8, a diagram illustrating an example object detection being performed on a video frame oriented towards a rear view mirror of the vehicle 50 is shown. A perspective 450 is shown. The perspective 450 may be a representation of a view of an interior 452 of the vehicle 50. In some embodiments, the view of the interior 452 of the vehicle 50 may be included on a video frame generated as discussed in relation to FIG. 6.

In some embodiments, the object 420, discussed in FIG. 7, bounding the approaching rear vehicle 418 may instead bound a mirror image 430 of the approaching vehicle 418. In some embodiments, the processors 106a-106n may be configured to perform operations to determine a distance to the approaching vehicle 418 based on the mirror image 430. The distance calculation may be based on known characteristics of the approaching vehicle 418 (e.g., based on type of vehicle, model of vehicle, make of the vehicle, etc.). In some embodiments, the distance calculation may be based on individual components of the approaching vehicle 418. For example, the distance calculation may be based on a relative size calculation of a headlight of the approaching vehicle 418 based on the mirror image 430. In another example, the distance calculation may further comprise a calculation of the various characteristics (e.g., shape, length, width, etc.) of a windshield of the approaching vehicle 418 based on the mirror image 430. The calculations may further be used and combined with the determination of type of vehicle, model of vehicle, make of vehicle, etc. In some embodiments, the distance calculation may be based on the proximity of a reference object with known characteristics (e.g., the road marking 302) also captured in the mirror image 430.

Additionally, the interior 452 of the vehicle 50 may comprise a windshield 454, a dashboard 456 and/or a steering wheel 458. A number of the displays 118a-118n are shown. In the example shown, the displays 118a-118i are shown throughout the interior 452. However, the number of the displays 118a-118n available in the vehicle 50 may be varied according to the design criteria of a particular implementation.

In the example shown, the display 118a may be located on the dashboard 456 to the left of the steering wheel 458. For example, the display 118a may be configured to display video data corresponding to the rear view from the driver side (e.g., emulating a driver side reflective mirror). In the example shown, the display 118b may be located at the top of the windshield 454. For example, the display 118b may be configured to display video data corresponding to the rear view (e.g., emulating a traditional reflective rearview mirror). In the example shown, the display 118c may be located on the dashboard 456 to the far right of the interior 452. For example, the display 118c may be configured to display video data corresponding to the rear view from the passenger side (e.g., emulating a passenger side reflective mirror).

The display 118d may be located on the dashboard 456 behind the steering wheel 458, and the displays 118e-118i may be located on the dashboard 456 at various locations to the right of the steering wheel 458. In one example, one or more of the displays 118d-118i may be configured to display vehicle information (e.g., warning icons, speed, distance, temperature, odometer, etc.). In another example, one or more of the displays 118d-118i may be configured as an infotainment touchscreen display (e.g., providing a user interface for audio, navigation, hands-free phone communication, etc.).

The processors 106a-106n may be configured to communicate any of the signals VOUT_A-VOUT_N to any of the displays 118a-118i. In an example, the user interface of the infotainment touchscreen (e.g., one of the displays 118a-118n) may be configured to enable the driver 202 (or a passenger in the vehicle 50) to customize the video output for each of the displays 118a-118n. In one example, the processors 106a-106n may enable one or more of the displays 118a-118n to duplicate a view. For example, the display 118a and the 118i may both display the rear view from the driver side emulating a driver side reflective mirror (e.g., to allow a driving instructor in the passenger seat to easily see the rear view from the passenger side). In another example, the processors 106a-106n may enable the driver 202 to select which of the displays 118a-118i display which video data. For example, the driver 202 may prefer to have the display 118e display the passenger side rear view instead of the display 118c, which is farther away.

The display 118e is shown as a large screen generally centered on the dashboard 456. The display 118e is shown displaying a graphic warning symbol 464. In some embodiments, the processors 106a-106n may display some sort of alert or warning (e.g., the warning symbol 464) if a fog lamp has automatically been turned off. For example, one or more of the rear fog lamps 212 may be turned off due to the approaching rear vehicle 418 and the processors 106a-106n send an alert to a display on the dashboard 456 (e.g., display 118e) alerting the driver 202 that a lamp has been automatically turned off. In the example shown, the warning graphic 464 may be an exclamation point within a triangle but is not limited to such and the warning may comprise other graphics, audio warnings, video views of the approaching rear vehicle 418, etc.

Figure 9:
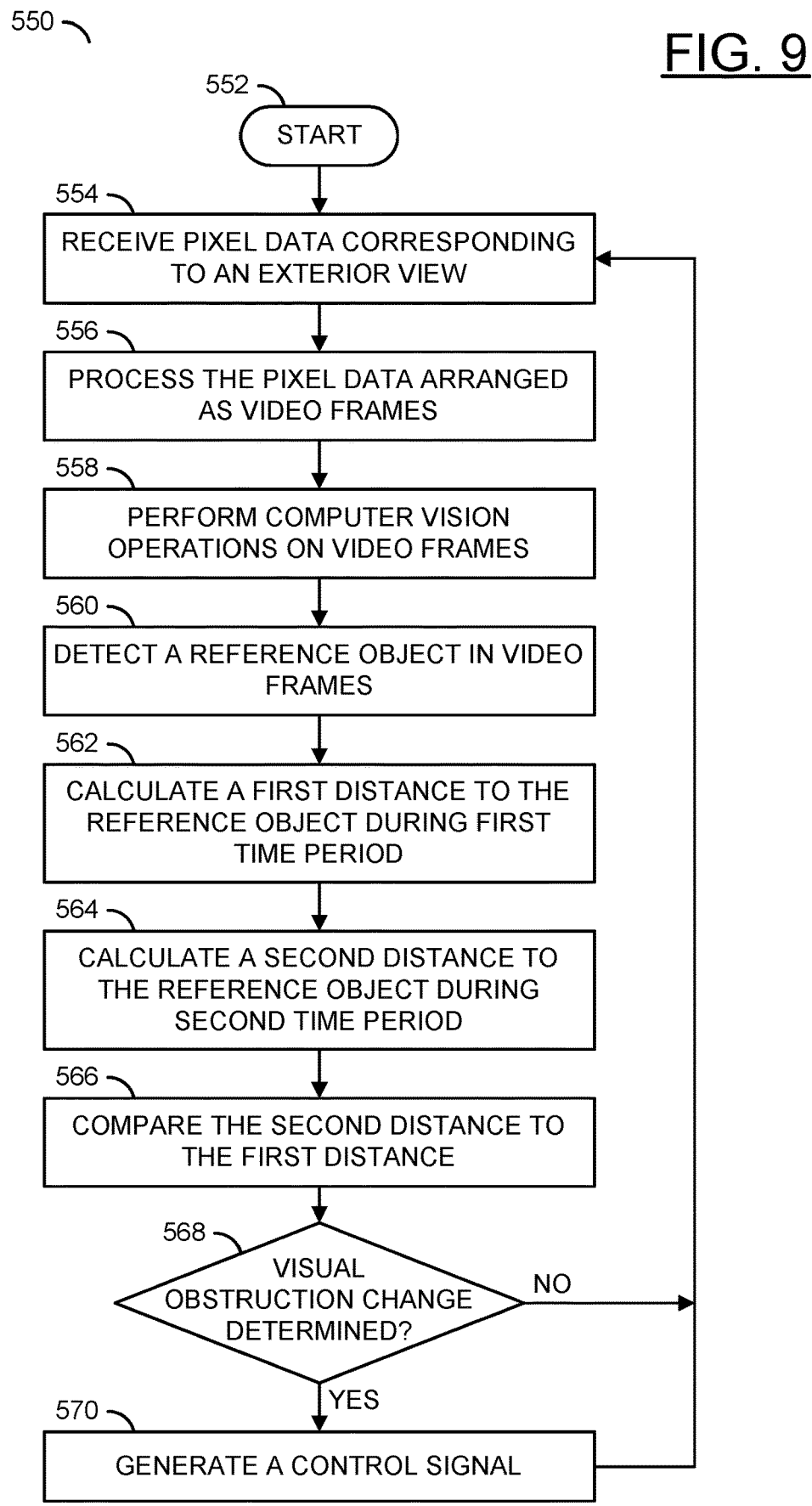
FIG. 9 is a flow diagram illustrating an example method for detecting a change in a visual obstruction.

Referring to FIG. 9, a method (or process) 550 is shown. The method 550 may automatically detect a change in a visual obstruction. The method 550 generally comprises a step (or state) 552, a step (or state) 554, a step (or state) 556, a step (or state) 558, a step (or state) 560, a step (or state) 562, a step (or state) 564, a step (or state) 566, a decision step (or state) 568, and a step (or state) 570.

The step 552 may start the method 550. In the step 554, the processors 106a-106n may receive pixel data. The pixel data may correspond to an exterior view from the vehicle 50. In some embodiments, the pixel data may be the signals FRAMES_A-FRAMES_N to presented by the capture devices 102a-102n. In some embodiments, the processors 106a-106n may generate video frames (e.g., FRAMES_A-FRAMES_N) from the received pixel data. In some embodiments, the processors 106a-106n may receive video frame data directly from the capture devices 102a-102n. Next, in the step 556, the processors 106a-106 may process the pixel data arranged as video frames. For example, one or more of the dedicated hardware modules 180a-180n and/or the video processing pipeline 156 may generate video frames from the signals FRAMES_A-FRAMES_N. Next, the method 550 may move to the step 558.

In the step 558, the processors 106a-106n may perform computer vision operations on the video frames. In an example, the video processing pipeline 156 may present the video frames to the CNN module 150 as the video frames are generated to enable real-time computer vision operations. Next, in the step 560, the CNN module 150 may perform object detection and/or determine the characteristics of the objects detected. The object detection, along with classification and/or segmentation, may be part of the computer vision operations performed by the CNN module 150. The object detection may comprise detecting a reference object for use in other steps of the method 550. In some embodiments, a reference object may be a detected object that is of consistent size and reoccurs while traveling in the vehicle 50. For example, the reference objects may be road markings (e.g., road markings 302, utility poles, street lights, street signs, etc.). In some embodiments, one of the reference objects may be a non-reoccurring object that comprises a metric that may be used to determine a level of visual obscurity between the vehicle 50 and the reference object. Next, the method 550 may move to the step 562.

In the step 562, the processors 106a-106n may calculate a first distance to the reference object (e.g., the road marking 302) during a first time period. In some embodiments, there may be a plurality of reference objects detected (e.g., the detected road markings shown in association with FIG. 6), and the first distance is the distance to the furthest reference object detected. The plurality of reference objects may be oriented in the same direction. For example, the plurality of reference objects may comprise dashed lane markings, such as a dashed center line, on a road comprising approximately the same length, width, and spacing. In some embodiments, the plurality of reference objects may be in different orientations. For example, not only are dashed lane markings running parallel to the road used by the vehicle 50 detected, but also dashed lane markings on intersecting roads that run perpendicular to the road used by the vehicle 50.

The distance to the furthest reference object detected may be an indicator of an amount of the visual obstruction 304 between the vehicle 50 and the reference objects (e.g., fog, rain, snow, smoke, etc.). Calculation of the distance may use known characteristics of the detected reference objects (e.g., average size, average dimensional attributes, etc.). For example, the known characteristics may comprise a typical length and width of road markings used in a particular region. In some implementations, a plurality of calculations may be averaged during the first time period to determine the first distance. Next, the method 550 may move to the step 564.

In the step 564, the processors 106a-106n may calculate a second distance to a reference object during a second time period. The second time period may be sufficiently separated in time from the first time period that there may be an increase or decrease of an amount of the visual obstruction 304 between the vehicle 50 and the reference objects (e.g., fog, rain, snow, smoke, etc.). In some embodiments, there may be a plurality of reference objects detected, and the second distance is the distance to the furthest reference object detected. The plurality of reference objects may be the same type of reference object (e.g., the road marking 302) as those used to calculate the first distance in the step 562. In some embodiments, the plurality of reference objects may be of a different type of reference object as use to calculate the first distance (e.g., road markings and mile markers). Even where the reference objects are of a different type, the reference objects may have similar spacing to the reference objects used to calculate a first distance to the reference object.

The distance to the furthest reference object detected may be an indicator of an amount of the visual obstruction 304 (e.g., fog, rain, snow, smoke, etc.) between the vehicle 50 and the reference objects 302. Calculation of the distance may use known characteristics of the detected reference objects (e.g., average size, average dimensional attributes, etc.) In some implementations, a plurality of calculations may be averaged during the second time period to determine the second distance. Next, the method 550 may move to the step 566.

In the step 566, the processors 106a-106n may compare the second distance to a reference object to the first distance to a reference object. Next, the method 550 may move to the decision step 568 to determine whether there has been a change in visual obstruction (or visibility distance) in the exterior surroundings around the vehicle 50. As the distance measurements are calculated in two different period of times, a comparison may reveal a difference in a level of visual obstruction between the vehicle 50 and each reference object (e.g., the road markings 302). For example, a decrease between the second distance as compared to the first distance may indicate that a level or intensity of the visual obstruction 304 (e.g., a level of fog, rain, snow, etc.) has increased. The determination that an increase in a level or intensity of the visual obstruction 304 may be made in response to detecting a decrease in the furthest distance to a reoccurring reference object. Conversely, a decrease in a level or intensity of the visual obstruction 304 may be determined in response to an increase in the furthest distance to a reoccurring reference object.

A determination that there has been a change in the visual obstruction 304 in the exterior surroundings around the vehicle 50 may mean that the method 550 may move to the step 570. A determination that there has not been a change in visual obstruction may mean that the method 550 returns to the step 554. In some implementations, a change in the visual obstruction 304 may meet or exceed a predetermined threshold for the method 550 to move to the step 570. For example, the furthest distance to a reoccurring reference object may increase (or decrease) by a predetermined amount of distance. In some implementations, there may be some change in visual obstruction as well as a comparison to an absolute value of visual obstruction. For example, when a change is detected and the furthest distance to a reoccurring reference object has decreased below a predetermined value of distance. In some implementations, the predetermined thresholds may be the same for an increase in visual obstruction as the predetermined threshold value for a decrease in visual obstruction. In some implementations, the predetermined thresholds for an increase in visual obstruction and a decrease in visual obstruction may differ.

In the step 570, the processors 106a-106n may generate a control signal based on a change in visual obstruction being determined. The control signal(s) (e.g., VCTRL) may enable and/or disable one or more lights. For example, the control signal(s) may enable one or more front fog lamps 214 and/or one or more rear fog lamps 212. Other lights of the vehicle 50 may be enabled and/or disabled such as headlights, high beams, interior lights, etc. In a more specific example, the processors 106a-106n may generate the control signal VCTRL to enable the front fog lamps 214 after an increase in a level of the visual obstruction 304 (e.g., fog) is determined. In a further example, the control signal VCTRL configured to disable a front fog lamp 214 may be generated after a determination that a change in the visual obstruction 304 has increased due to the front fog lamp 214 being enabled. In another example, the control signal VCTRL configured to disable all of the front fog lamps 214 and the rear fog lamps 212 is generated after a decrease in a level of the visual obstruction 304 (e.g., fog) is determined. Next, the method 550 may return to the step 554.

Figure 10:
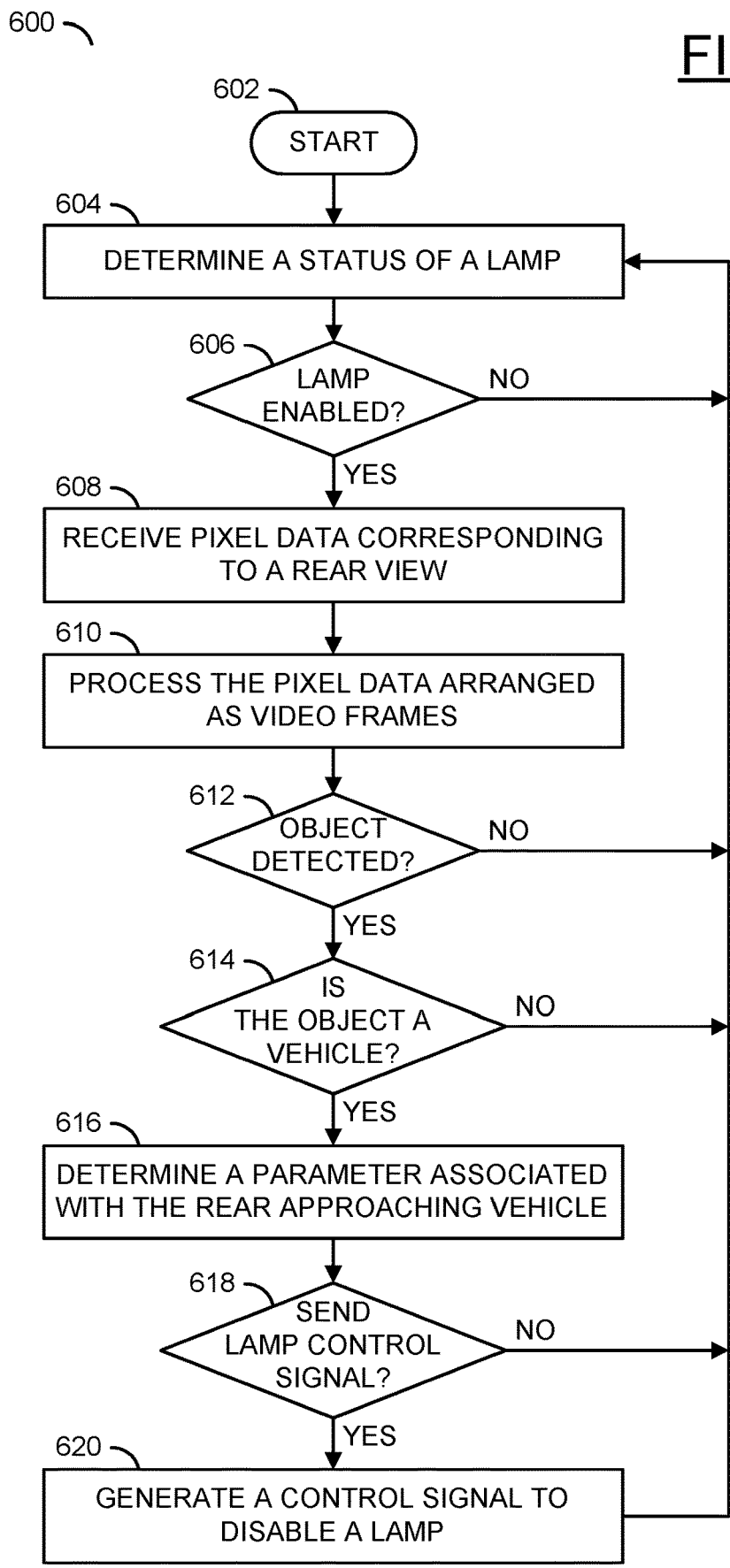
FIG. 10 is a flow diagram illustrating an example method for generating a control signal in response to detecting a rear approaching vehicle.

Referring to FIG. 10, a method (or process) 600 is shown. The method 600 may generate a control signal in response to detecting a rear approaching vehicle (e.g., the rear approaching vehicle 418). The method 600 generally comprises a step (or state) 602, a step (or state) 604, a decision step (or state) 606, a step (or state) 608, a step (or state) 610, a decision step (or state) 612, a decision step (or state) 614, a step (or state) 616, a decision step (or state) 618, and a step (or state) 620.

The step 602 may start the method 600. In the step 604, the processors 106a-106n may determine a status of a lamp. For example, the processors 106a-106n may determine a status of one or more of the rear fog lamps 212. Next, the method 600 may move to the decision step 606 to determine whether the lamp 212 is enabled. If a determination is made that a lamp (e.g., a rear fog lamp 212) is not enabled, the method 600 may return to the step 604. If a determination is made that the lamp 212 is enabled, method 600 may proceed with the step 608.

In the step 608, the processors 106a-106n may receive pixel data. The pixel data may correspond to a rear exterior view from the vehicle 50. In some embodiments, the pixel data may be received when one or more of the capture devices 102a-102n present the signals FRAMES_A-FRAMES_N to the processors 106a-106n. For example, the rear view may be captured by one or more rear facing capture devices 102a-102n (as shown in association with FIG. 7). In some embodiments, the rear view may be from one or more capture devices 102a-102n capturing an image in a reflective surface (e.g., a rear view mirror). Next, the method 600 may move to the decision step 612.

In the decision step 612, the CNN module 150 may perform object detection and/or determine the characteristics of the objects detected. The object detection may be part of the computer vision operations performed by the CNN module 150. If an object is not detected, the method 600 may return to step 604. If an object is detected, the method 600 may proceed to the decision step 614.

In the decision step 614, the processors 106a-106n may perform computer vision operations on the video frames for object detection and classification. The object classification and/or segmentation may be part of the computer vision operations performed by the CNN module 150. The object may be classified as a vehicle. The computer vision operations may identify and classify a plurality of objects without any of the objects classified as a vehicle. The computer vision operations may identify and classify a plurality of objects with one or more of them identified as a vehicle. If an object classified as a vehicle is not detected, the method 600 may return to step 604. If an object classified as a vehicle (e.g., the rear approaching vehicle 418) is detected, the method 600 may proceed to the step 616.

In the step 616, the processors 106a-106n may determine a parameter associated with the rear approaching vehicle 418. The parameter may be used by the decision module 158 to determine whether to turn off a lamp (e.g., the rear fog lamp 212). For example, the parameter may be a distance between the vehicle 50 and the rear approaching vehicle 418. As another example, the parameter may be an approach speed of the rear approaching vehicle 418 to the vehicle 50. As another example, the parameter may be a characteristic of a visual alert detected and associated with the rear approaching vehicle 418, such as flashing head lights, flashing high beams, flashing hazard lights, etc. Next, the method 600 may move to the decision step 618.

In the decision step 618, the processors 106a-106n may determine whether to send a lamp control signal (e.g., VCTRL) to disable a lamp (e.g., the rear fog lamp 212) based on the parameter associated with the rear approaching vehicle 418. For example, the parameter associated with a distance of the rear approaching vehicle 418 to the vehicle 50 may decrease below a predetermined threshold value. In another example, the parameter associated with an approach speed between the rear approaching vehicle 418 and the vehicle 50 may be above a predetermined threshold value. In a further example, the parameter associated with an alert signal from the rear approaching vehicle 418 may be detected. Some combination of one or more parameters may also be used by the processors 106a-106n to determine whether to send the lamp control signal VCTRL. For example, if a distance of the rear approaching vehicle 418 to the vehicle decreases below a first predetermined threshold value and an approach speed between the rear approaching vehicle 418 and the vehicle 50 increases above a second predetermined threshold value, the lamp control signal VCTRL configured to disable the lamp may be sent. If a determination is made based on the determined parameters to not send the lamp control signal VCTRL, the method 600 may return to the step 604. If a determination is made based on the determined parameters to send the lamp control signal VCTRL, the method 600 may proceed to the step 620. In step 620, the processors 106a-106n may generate the control signal VCTRL to disable one or more lamps. For example, the control signal VCTRL may disable one or more rear fog lamps 212. Other lights of the vehicle 50 may also be disabled such as high beams. For example, based on the parameters of the rear approaching vehicle 418, the decision module 158 may determine that the rear approaching vehicle 418 is coming close up behind the vehicle 50 and passing and therefore both the one or more rear fog lamps 212 and the one or more front fog lamps 214 should be temporarily disabled. Next, the method 600 may return to the step 604.

Figure 11:
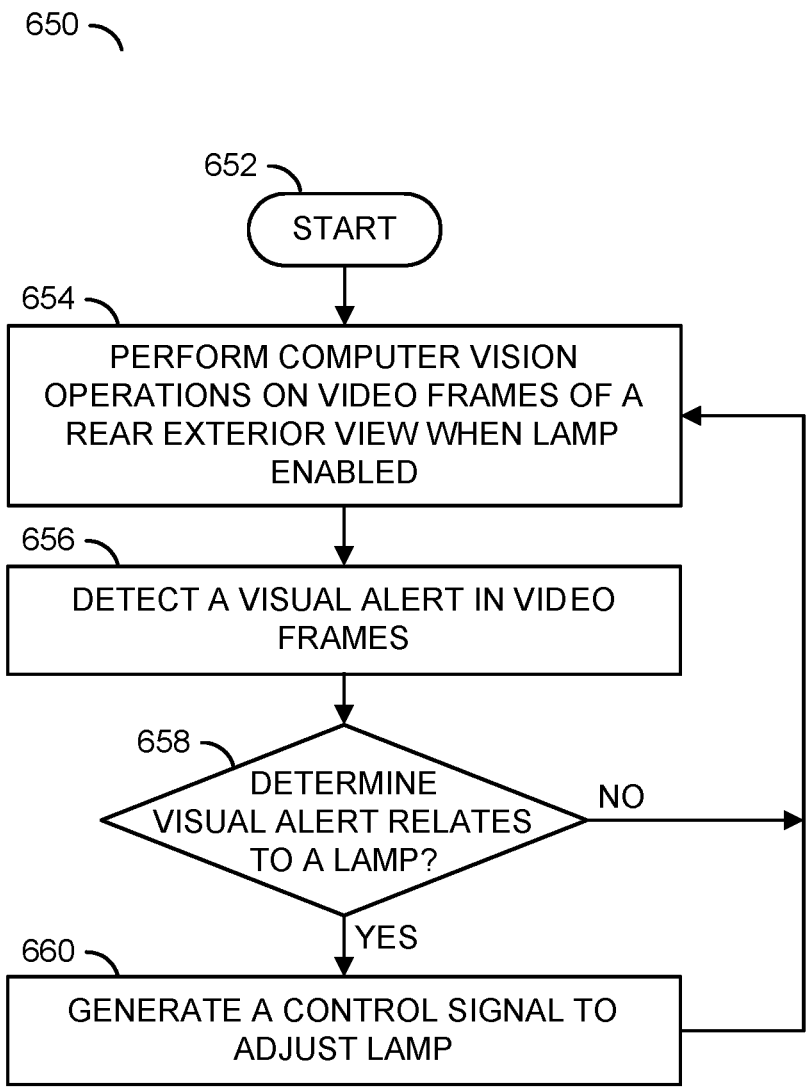
FIG. 11 is a flow diagram illustrating an example method for generating a control signal based on a visual alert.

Referring to FIG. 11, a method (or process) 650 is shown. The method 650 may generate a control signal based on a visual alert. The method 650 generally comprises a step (or state) 652, a step (or state) 654, a step (or state) 656, a decision step (or state) 658, and a step (or state) 660.

The step 652 may start the method 650. In the step 654, the processors 106a-106n may perform computer vision operations on video frames of a rear exterior view when the lamp (e.g., the rear fog lamp 212) is enabled. In an example, the video processing pipeline 156 may present the video frames to the CNN module 150 as the video frames are generated to enable real-time computer vision operations. Next, in the step 656, the CNN module 150 may perform object detection and/or determine the characteristics of the objects detected or order to detect a visual alert. The object detection, along with classification and/or segmentation, may be part of the computer vision operations performed by the CNN module 150. The object detection may comprise detecting a visual alert. The visual alert may be associated with other nearby vehicles in front of or to the rear of the vehicle 50. For example, a visual alert detected associated with another vehicle may be flashing head lights, flashing high beams, or flashing hazards. Other visual alerts may include arms using hand signals and/or waving. Other visual alerts that may be associated with the lamps of the vehicle 50 are also contemplated. The types of visual alerts detected may be varied according to the design criteria of a particular implementation. Next, the method 650 may move to the decision step 658.

In the decision step 658, the processors 106a-106n may perform computer vision operations on the video frames for object detection and classification to determine whether the object may be classified as being associated with a visual alert. In one example, the computer vision operations may identify and/or classify a visual alert but not classify the identified visual alert as a visual alert that relates to a lamp (e.g., the front fog lamp 214 and/or the rear fog lamp 212). In another example, the computer vision operations may identify and/or classify a visual alert and classify the identified visual alert as a visual alert that relates to a lamp (e.g., the type of visual alert detected may be associated with a request to dim or turn of certain lamps of the vehicle 50). For example, a detection of a visual alert of a rear approaching vehicle 418 flashing high beams may be interpreted as a request to dim one or more rear fog lamps 212. In another example, a detection of a visual alert of an oncoming vehicle flashing high beams may be interpreted as a request to dim one of headlights or the front fog lamps 214. In a further example, a detection of a visual alert of an arm waving in a vehicle in front of the vehicle 50 may be interpreted as a request to dim one of headlights or the front fog lamps 214. If a visual alert that relates to a lamp is not detected, the method 650 may return to the step 654. If a visual alert that relates to a lamp is detected, the method 650 may continue to the step 660.

In the step 660, the processors 106a-106n may generate the control signal VCTRL in response to a determination that the visual alert that relates to a lamp has been detected. The control signal(s) (e.g., VCTRL) may disable one or more lights. For example, the control signal(s) VCTRL may disable one or more front fog lamps 214 and/or one or more rear fog lamps 212. Other lights of the vehicle 50 may be disabled such as high beams, head lights, interior lights, etc. In a more specific example, the processors 106a-106n may generate the control signal VCTRL to disable the front fog lamp 214 after a detection of a visual alert from in front of the vehicle 50. In another example, the control signal VCTRL configured to disable one or more of the rear fog lamps 212 may be generated after a detection of the visual alert from the rear of the vehicle 50. Next, the method 650 may return to the step 654.

Figure 12:
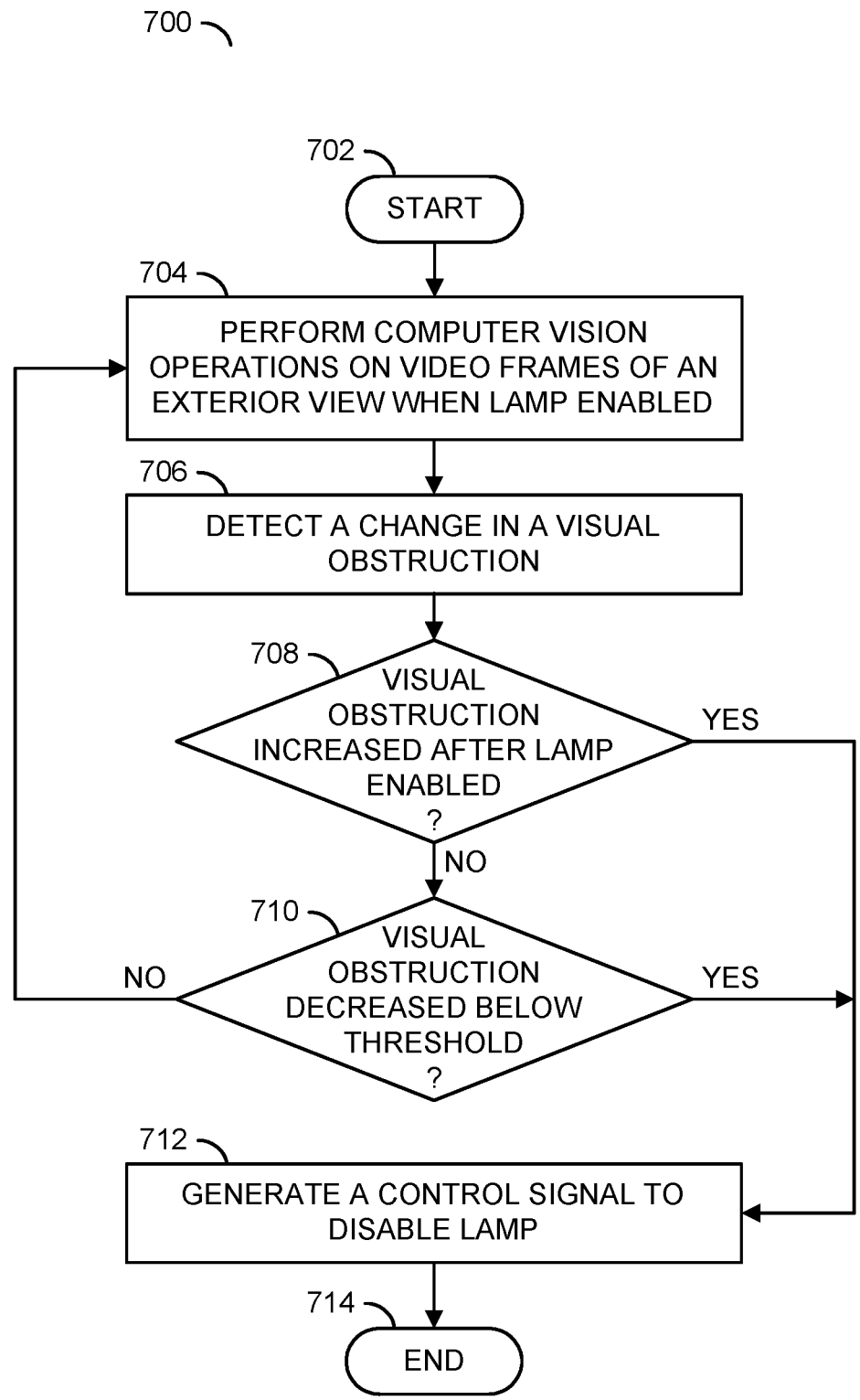
FIG. 12 is a flow diagram illustrating an example method for determining conditions to disable a lamp.

Referring to FIG. 12, a method (or process) 700 is shown. The method 700 may automatically determine conditions to disable a lamp. The method 700 generally comprises a step (or state) 702, a step (or state) 704, a step (or state) 706, a decision step (or state) 708, a decision step (or state) 710, a step (or state) 712, and a step (or state) 714.

The step 702 may start the method 700. In the step 704, the processors 106a-106n may perform computer vision operations on video frames of an exterior view of vehicle 50 when a lamp is enabled (e.g., the rear fog lamp 212, the front fog lamp 214, etc.). In an example, the video processing pipeline 156 may present the video frames to the CNN module 150 as the video frames are generated to enable real-time computer vision operations. Next, in the step 706, the CNN module 150 may perform object detection and/or determine the characteristics of the objects detected in order to detect a change in a visual obstruction. Various systems, methods, and processes are described herein for detecting changes in external visual obstructions. For example, external visual obstructions may comprise fog, snow, rain, smoke, etc. The change in visual obstruction detection, along with classification and/or segmentation may be part of the computer vision operations performed by the CNN module 150. Next, the method 700 may move to the decision step 708.

In the decision step 708, the processors 106a-106n may determine whether a visual obstruction has increased after the lamp has been enabled. Various systems, methods, and processes are described herein for detecting an increase in external visual obstructions. For example, the processors 106a-106n determine that turning on one or more of the front fog lamps 214 created an increase in the visual obstruction 304 rather than helping to mitigate the visual obstruction 304. In another example, the processors 106a-106n may determine that turning on one or more of the rear fog lamps 212 created an increase in the visual obstruction 304 rather than helping to mitigate the visual obstruction 304. If the processors 106a-106n determine that the visual obstruction 304 increased after the lamp has been enabled, method 700 may skip forward to the step 712. In the step 712, processors 106a-106n may generate a control signal (e.g., VCTRL) to disable the lamp associated with the increase in the visual obstruction 304. The method 700 may then end with the step 714. In the decision step 708, if the processors 106a-106n determine that a visual obstruction has not increased (or has remained the same or decreased) after the lamp has been enabled, the method 700 may continue with the decision step 710.

In the decision step 710, the processors 106a-106n may determine whether a level of the visual obstruction 304 has decreased below a predetermined threshold. Various systems, methods, and processes are described herein for detecting a decrease in external visual obstructions. In one example, the processors 106a-106n determine that fog has dissipated to an extent that the visual obstruction caused by the fog falls below the threshold. One or more of the rear fog lamps 212 and/or the front fog lamps 214 may be disabled in response to the level of visual obstruction 304 falling below the threshold. If the processors 106a-106n determine that a level of the visual obstruction 304 has decreased below the predetermined threshold, the method 700 may move to the step 712. In the step 712, the processors 106a-106n may generate a control signal (e.g., VCTRL) to disable one or more lamps (e.g., one or more of the rear fog lamps 212 and/or the front fog lamps 214) determined not to be required for improving visibility. The method 700 may then end with the step 714. In the decision step 710, if the processors 106a-106n determine that a level of the visual obstruction 304 has not yet decreased below the predetermined threshold, the method 700 may return to the step 704.

Figure 13:
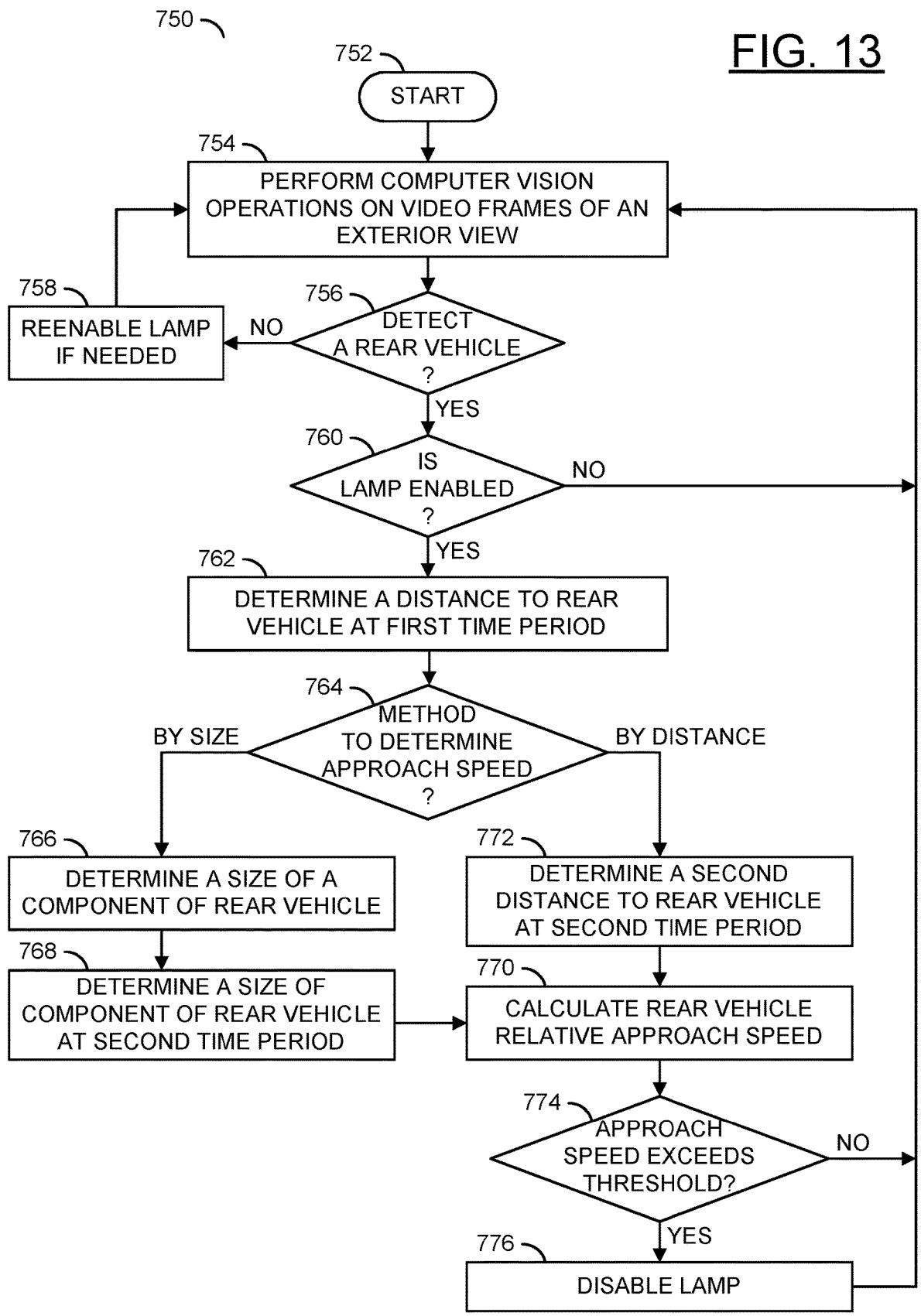
FIG. 13 is a flow diagram illustrating an example method for determining a relative approach speed of a rear vehicle.

Referring to FIG. 13, a method (or process) 750 is shown. The method 750 may automatically determine a relative approach speed of a rear vehicle. The method 750 generally comprises a step (or state) 752, a step (or state) 754, a decision step (or state) 756, a step (or state) 758, a decision step (or state) 760, a step (or state) 762, a decision step (or state) 764, a step (or state) 766, a step (or state) 768, a step (or state) 770, a step (or state) 772, a decision step (or state) 774, and a step (or state) 776.

The step 752 may start the method 750. In the step 754, the processors 106a-106n may perform computer vision operations on video frames of an exterior view from vehicle 50. In an example, the video processing pipeline 156 may present the video frames to the CNN module 150 as the video frames are generated to enable real-time computer vision operations. Next, in the decision step 756, the CNN module 150 may perform object detection and/or determine the characteristics of the objects detected. The object detection may comprise detecting a vehicle approaching the rear of vehicle 50 (e.g., the rear approaching vehicle 418). For example, the computer vision operations may identify and classify a plurality of objects without any of the objects classified as a vehicle. The computer vision operations may identify and classify a plurality of objects with one or more of them identified as a vehicle. If an object classified as a vehicle is not detected, method 750 may go to the step 758. The step 758 may re-enable a lamp if needed. For example, if a lamp such as one or more of the rear fog lamps 212 is disabled due to the detection of the rear approaching vehicle 418, the lamp may be re-enabled once there is no longer detection of the rear approaching vehicle 418 behind the vehicle 50. Re-enabling the lamp may also be based on whether conditions resulting in the visual obstruction 304 for the vehicle 50 are still aided by the one or more rear fog lamps 212. The method 750 may then return to the step 754. If an object classified as the rear approaching vehicle 418 is detected, the method 750 may go to the decision step 760.

In the decision step 760, the processors 106a-106n may determine whether a lamp is enabled. In some embodiments, the lamp may be one or more of the rear fog lamps 212. If a determination is made that a lamp (e.g., the rear fog lamp 212) is not enabled, the method 750 may return to the step 754. If a determination is made that a lamp is enabled, the method 750 may proceed with the step 762.

In the step 762, the processors 106a-106n may calculate a first distance to the rear approaching vehicle 418 during a first time period. Calculation of the distance may use known characteristics common to vehicles. Various ways of detecting distance to an object are described herein and may be applied to calculating the distance to the rear approaching vehicle 418. In some implementations, a plurality of calculations may be averaged during the first time period to determine the first distance. In some implementations, determining the distance to the rear approaching vehicle 418 may be optional if the method 750 later proceeds to the step 766 to use a size of one or more components of the rear approaching vehicle 418 to determine an approach speed. Next, the method 750 may move to the decision step 764.

In the decision step 764, the processors 106a-106n may determine a way (e.g., a method, a technique, etc.) to determine an approach speed of the rear approaching vehicle 418. In some implementations, the approach speed may be calculated using a size of one or more components of the rear approaching vehicle 418. Determining an approach speed based on a size may include using the entire size of the rear approaching vehicle 418. If using a size of one or more components, the method 750 may proceed to the step 766. In some implementations, the approach speed may be calculated using a second distance calculation at a second time period. If using the second distance calculation, the method 750 may proceed to the step 772.

If using the size of one or more components to determine the approach speed of the rear approaching vehicle 418, the method 750 may proceed to the step 766 to determine a size of a component of the rear approaching vehicle 418. For example, the processors 106a-106n may perform a relative size calculation of a headlight of the rear approaching vehicle 418. In another example, the distance calculation may further comprise a calculation used to determine various characteristics (e.g., shape, length, width, etc.) of a windshield of the rear approaching vehicle 418. The size calculation of objects with computer vision operations have been described herein and may be applied.

The size calculations may further be used and combined with a determination of type of vehicle, model of vehicle, make of vehicle, etc. In some embodiments, the size calculation may be further based on the proximity of a reference object with known characteristics (e.g., the characteristics of a road marking 302 near the rear approaching vehicle 418 are known). The method 750 may proceed to the step 768 to determine a size of the component of the rear approaching vehicle 418 during a second time period. Next, the method 750 may move to the step 770.

In the decision step 764, if using a second distance calculation to determine the approach speed of the rear approaching vehicle 418, the method 750 may proceed to the step 772. In the step 772, the processors 106a-106n may calculate a second distance to the rear approaching vehicle 418 during a second time period. In some implementations, a plurality of calculations may be averaged during the second time period to determine the second distance. Next, the method 750 may move to the step 770.

In the step 770, the processors 106a-106n may calculate the approach speed of the rear approaching vehicle 418. If determining the approach speed by the size of a component of the rear approaching vehicle 418, the processors 106a-106n may use the difference in time between the first time period and the second time period and the difference in relative sizes of the component of the rear approaching vehicle 418 during the first time period and the second time period. The size calculations may further be used and combined with the determination of the type of vehicle, model of vehicle, make of vehicle, etc. In some embodiments, the size calculation may be further based on the proximity of a reference object with known characteristics (e.g., the characteristics of a road marking 302 near the rear approaching vehicle 418 are known). If determining an approach speed by determining the second distance, the processors 106a-106n may calculate the second distance to the rear approaching vehicle 418 during the second time period. In some implementations, a plurality of calculations may be averaged during the second time period to determine the second distance. Next, the method 750 may move to the decision step 774.

In the decision step 774, the processors 106a-106n may determine that the calculated approach speed exceeds a predetermined threshold. In some implementations, determining whether the calculated approach speed exceeds the threshold may be combined with one or more of the distance measurements determined in the method 750 where both the distance measurement and the calculated approach speeds may exceed the predetermined thresholds. If a determination is made by the processors 106a-106n that one or more predetermined thresholds have not been exceeded, then the method may return to the step 754. If a determination is made by the processors 106a-106n that one or more predetermined thresholds have been exceeded, then the method 750 may proceed to the step 776.

In the step 776, the processors 106a-106n may generate a control signal based on a determination that one or more predetermined thresholds have been exceeded. The control signal(s) (e.g., VCTRL) may disable one or more lights. For example, the control signal VCTRL may be configured to disable one or more of the rear fog lamps 212. Other lights of the vehicle 50 may be enabled and/or disabled such as headlights, high beams, interior lights, etc. Next, the method 750 may return to the step 754.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
  an interface configured to receive pixel data corresponding to an exterior view from a vehicle; and
  a processor configured to (i) process the pixel data arranged as video frames, (ii) perform computer vision operations on the video frames to (a) detect a reference object in the video frames, (b) calculate a first distance to the reference object during a first time period, and (c) calculate a second distance to the reference object during a second time period, (iii) compare the second distance to the first distance, (iv) determine a presence of a visual obstruction based on the comparison, and (v) generate a control signal to enable a lamp in response to determining the presence of the visual obstruction, wherein the reference object comprises a road marking for a dashed center line.

2. The apparatus according to claim 1, wherein the visual obstruction is at least one of fog, rain, or snow.

3. The apparatus according to claim 1, wherein the processor, in determining the presence of the visual obstruction, is further configured to (i) perform computer vision operations on the video frames to calculate a third distance to the reference object during a third time period while the lamp is enabled, (ii) compare the third distance to the second distance, and (iii) determine a continuing status of the lamp based on the comparison of the third distance to the second distance.

4. The apparatus according to claim 1, wherein the processor is further configured to (i) perform computer vision operations on the video frames during a third time period to detect a second vehicle behind the vehicle and (ii) generate the control signal to disable the lamp in response to detecting the second vehicle.

5. The apparatus according to claim 4, wherein (i) the control signal is configured to enable and disable the lamp and a second fog lamp, (ii) the lamp comprises a rear fog lamp and the second fog lamp comprises a front fog lamp, and (iii) the computer vision operations on the video frames during the third time period to detect the second vehicle are performed on portions of the video frames comprising a representation of a rear view mirror.

6. The apparatus according to claim 1, wherein (i) the interface is further configured to receive additional pixel data corresponding to a second exterior view from the vehicle and (ii) the processor is further configured to (a) process the additional pixel data arranged as additional video frames, (b) perform computer vision operations on the additional video frames during a third time period to detect a second vehicle behind the vehicle, and (c) generate the control signal to disable a second lamp in response to detecting the second vehicle.

7. The apparatus according to claim 6, wherein (i) the lamp comprises a front fog lamp, (ii) the second lamp comprises a rear fog lamp, and (iii) the second exterior view is to a rear of the vehicle.

8. The apparatus according to claim 1, wherein the computer vision operations are implemented by a convolutional neural network.

9. The apparatus according to claim 8, wherein the convolutional neural network is trained using fleet learning.

10. The apparatus according to claim 9, wherein (i) the fleet learning comprises capturing reference images, (ii) the reference images comprise a surface of a roadway, and (iii) the reference images are used as training data for the convolutional neural network.

11. The apparatus according to claim 1, wherein (i) the computer vision operations detect the reference object by performing feature extraction based on weight values for each of a plurality of visual features that are associated with the reference object extracted from the video frames and (ii) the weight values are determined in response to an analysis of training data by the processor prior to the feature extraction.

12. The apparatus according to claim 1, wherein the computer vision operations are further performed by (i) applying a feature detection window to each of a plurality of layers extracted from the video frames and (ii) a convolution operation using matrix multiplication of the plurality of layers defined by the feature detection window.

13. The apparatus according to claim 1, wherein calculations for the first distance and the second distance are performed by calculating a furthest distance to a reoccurring reference object.

14. The apparatus according to claim 1, wherein the processor is further configured to (i) perform computer vision operations on the video frames during a third time period to detect a second vehicle behind the vehicle, (ii) analyze characteristics of the second vehicle to detect a visual alert, (iii) determine whether the visual alert is related to the lamp, (iv) disable the lamp in response to the visual alert if the visual alert is related to the lamp and (v) do not disable the lamp in response to the visual alert if the visual alert is not related to the lamp.

15. The apparatus according to claim 14, wherein the visual alert is related to the lamp if the visual alert comprises at least one of flashing head lights, flashing high beams and flashing hazards.

16. The apparatus according to claim 14, wherein the processor is further configured to (i) perform the computer vision operations to determine whether the second vehicle has passed the vehicle if the lamp has been disabled in response to the visual alert and (ii) re-enable the lamp in response to the second vehicle passing the vehicle.

17. An apparatus comprising:
an interface configured to receive pixel data corresponding to an exterior view from a vehicle; and
a processor configured to (i) process the pixel data arranged as video frames, (ii) perform computer vision operations on the video frames to (a) detect a reference object in the video frames, (b) calculate a first distance to the reference object during a first time period, and (c) calculate a second distance to the reference object during a second time period, (iii) compare the second distance to the first distance, (iv) determine a presence of a visual obstruction based on the comparison, and (v) generate a control signal to enable a lamp in response to determining the presence of the visual obstruction, wherein calculations for the first distance and the second distance are performed by calculating a furthest distance to a reoccurring reference object.

18. An apparatus comprising:
an interface configured to receive pixel data corresponding to an exterior view from a vehicle; and
a processor configured to (i) process the pixel data arranged as video frames, (ii) perform computer vision operations on the video frames to (a) detect a reference object in the video frames, (b) calculate a first distance to the reference object during a first time period, and (c) calculate a second distance to the reference object during a second time period, (iii) compare the second distance to the first distance, (iv) determine a presence of a visual obstruction based on the comparison, and (v) generate a control signal to enable a lamp in response to determining the presence of the visual obstruction, wherein the processor, in determining the presence of the visual obstruction, is further configured to
(i) perform computer vision operations on the video frames to calculate a third distance to the reference object during a third time period while the lamp is enabled,
(ii) compare the third distance to the second distance, and (iii) determine a continuing status of the lamp based on the comparison of the third distance to the second distance.

19. The apparatus according to claim 18, wherein (i) the third distance is greater than the second distance and (ii) the continuing status of the lamp is enabled.

20. The apparatus according to claim 18, wherein (i) the third distance is less than the second distance, (ii) the continuing status of the lamp is disabled, and (iii) the processor is further configured to generate the control signal to disable the lamp in response to determining the third distance is less than the second distance.

* * * * *